(12) United States Patent
Bonnah et al.

(10) Patent No.: US 11,225,145 B1
(45) Date of Patent: Jan. 18, 2022

(54) APPARATUS AND METHOD FOR EMERGENCY CONTROL FOR VEHICLE

(71) Applicant: Honda Motor Co., Ltd., Tokyo (JP)

(72) Inventors: Jerry Erin Bonnah, Huntington Beach, CA (US); Narith Choeun, Long Beach, CA (US)

(73) Assignee: Honda Motor Co., Ltd., Tokyo (JP)

( * ) Notice: Subject to any disclaimer, the term of this patent is extended or adjusted under 35 U.S.C. 154(b) by 21 days.

(21) Appl. No.: 17/021,244

(22) Filed: Sep. 15, 2020

(51) Int. Cl.
| | | |
|---|---|---|
| G08B 21/00 | (2006.01) | |
| B60K 35/00 | (2006.01) | |
| B60W 40/08 | (2012.01) | |
| G06K 9/00 | (2006.01) | |
| B60W 40/105 | (2012.01) | |
| H04W 4/90 | (2018.01) | |
| H04W 4/40 | (2018.01) | |
| H04W 4/029 | (2018.01) | |

(52) U.S. Cl.
CPC .......... *B60K 35/00* (2013.01); *B60W 40/08* (2013.01); *B60W 40/105* (2013.01); *G06K 9/00832* (2013.01); *H04W 4/029* (2018.02); *H04W 4/40* (2018.02); *H04W 4/90* (2018.02); *B60K 2370/143* (2019.05); *B60K 2370/1575* (2019.05); *B60K 2370/16* (2019.05); *B60W 2040/089* (2013.01); *B60W 2040/0872* (2013.01); *B60W 2556/45* (2020.02)

(58) Field of Classification Search
CPC ..... B60K 35/00; B60W 40/08; B60W 40/105; G06K 9/00832; H04W 4/029
USPC ....................................... 340/438
See application file for complete search history.

(56) References Cited

U.S. PATENT DOCUMENTS

| | | |
|---|---|---|
| 8,565,936 B2 | 10/2013 | Kato et al. |
| 8,811,938 B2 | 8/2014 | Paek et al. |
| 9,997,077 B2 | 6/2018 | Oshida et al. |
| 10,271,196 B1 | 4/2019 | Yanamandra |
| 10,373,478 B2 | 8/2019 | Nepo |

(Continued)

FOREIGN PATENT DOCUMENTS

| | | |
|---|---|---|
| CN | 106254808 A | 12/2016 |
| CN | 110522429 A | 12/2019 |

(Continued)

*Primary Examiner* — Tai T Nguyen
(74) *Attorney, Agent, or Firm* — American Honda Motor Co., Inc.; Aaron Fong

(57) ABSTRACT

An electronic apparatus for an emergency control is provided. The electronic apparatus controls a human machine interface associated with a first vehicle to display a first user-selectable element. The electronic apparatus receives a first input, which corresponds to a first selection of the first user-selectable element. The first selection indicates a request to enable an emergency mode. The electronic apparatus activates a timer, which is associated with the electronic apparatus, for a pre-determined time period based on the first input. The electronic apparatus establishes a first communication with an emergency device associated with the first vehicle for the emergency mode, based on an expiration of the timer. The electronic apparatus deactivates a second user-selectable element on the human machine interface based on the first communication. The electronic apparatus receives one or more control instructions for the first vehicle from the emergency device based on the first communication.

20 Claims, 9 Drawing Sheets

(56) References Cited

U.S. PATENT DOCUMENTS

| | | | |
|---|---|---|---|
| 10,571,292 B2 | 2/2020 | Schmell et al. | |
| 2008/0129547 A1* | 6/2008 | Shinoda | G08G 1/205 340/991 |
| 2015/0221196 A1 | 8/2015 | Rafin et al. | |
| 2015/0339031 A1 | 11/2015 | Zeinstra et al. | |
| 2017/0352273 A1 | 12/2017 | Tuukkanen et al. | |

FOREIGN PATENT DOCUMENTS

| | | |
|---|---|---|
| DE | 102016218382 A1 | 3/2018 |
| WO | 2011013113 A1 | 2/2011 |
| WO | 2016116861 A2 | 7/2016 |

* cited by examiner

APPARATUS AND METHOD FOR EMERGENCY CONTROL FOR VEHICLE

BACKGROUND

Generally, vehicles (such as, non-autonomous vehicles and autonomous vehicle) may be used by an occupant (such as, a driver or a passenger) to travel on a travel route. In case of an emergency situation (such as, a medical emergency for the occupant or accidents), the occupant or the vehicle may need to contact an emergency center, to get assistance regarding the emergency situation. However, in certain situations of emergency, it may be difficult and time-consuming for the occupant to contact the emergency center.

Certain vehicles may have an emergency mode option available in the vehicle, and the occupant may activate the emergency mode option during the emergency situation to get the assistance for the emergency situation. However, at times, there may be a false activation (such as activation of the emergency mode option due to a mistake of the occupant) of the emergency mode, which may lead to a fine or a penalty for the occupant or incorrect communication of the emergency situation.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

According to an embodiment of the disclosure, an electronic apparatus for emergency control for vehicle is provided. The electronic apparatus may include a memory. The electronic apparatus may further include circuitry which may be coupled with the memory. The circuitry may control a human machine interface (HMI) associated with a first vehicle to display a first user-selectable element. The first user-selectable element may be configured to enable an emergency mode of the first vehicle. The circuitry may further receive a first input, which may correspond to a first selection of the displayed first user-selectable element. The first selection may indicate a request to enable the emergency mode. The circuitry may further activate a timer, which may be associated with the electronic apparatus, for a pre-determined time period based on the received first input. The circuitry may further establish a first communication with an emergency device associated with the first vehicle for the emergency mode, based on an expiration of the timer. The circuitry may further deactivate a second user-selectable element on the human machine interface (HMI) based on the established first communication with the emergency device. The second user-selectable element may be configured to cancel the request. The circuitry may further receive one or more control instructions for the first vehicle from the emergency device based on the established first communication.

According to another embodiment of the disclosure, a method for emergency control for a vehicle is provided. The method may be performed in an electronic apparatus. The method may include controlling a human machine interface (HMI) that may be associated with a first vehicle to display a first user-selectable element. The first user-selectable element may be configured to enable an emergency mode of the first vehicle. The method may further include receiving a first input, which may correspond to a first selection of the displayed first user-selectable element. The first selection may indicate a request to enable the emergency mode. The method may further include activating a timer, that may be associated with the electronic apparatus, for a pre-determined time period based on the received first input. The method may further include establishing a first communication with an emergency device associated with the first vehicle for the emergency mode, based on an expiration of the timer. The method may further include deactivating a second user-selectable element on the human machine interface (HMI) based on the established first communication with the emergency device. The second user-selectable element may be configured to cancel the request. The method may further include receiving one or more control instructions for the first vehicle from the emergency device based on the established first communication.

According to an embodiment of the disclosure, a non-transitory computer-readable medium is provided. The non-transitory computer-readable medium may store thereon, computer-executable instructions which, when executed by an electronic apparatus, cause the electronic apparatus to execute operations. The operations may include controlling a human machine interface (HMI) that may be associated with a first vehicle to display a first user-selectable element. The first user-selectable element may be configured to enable an emergency mode of the first vehicle. The operations may further include receiving a first input, which may correspond to a first selection of the displayed first user-selectable element. The first selection may indicate a request to enable the emergency mode. The operations may further include activating a timer, that may be associated with the electronic apparatus, for a pre-determined time period based on the received first input. The operations may further include establishing a first communication with an emergency device associated with the first vehicle for the emergency mode, based on an expiration of the timer. The method may further include deactivating a second user-selectable element on the human machine interface (HMI) based on the established first communication with the emergency device. The second user-selectable element may be configured to cancel the request. The method may further include receiving one or more control instructions for the first vehicle from the emergency device based on the established first communication.

Figure 1:
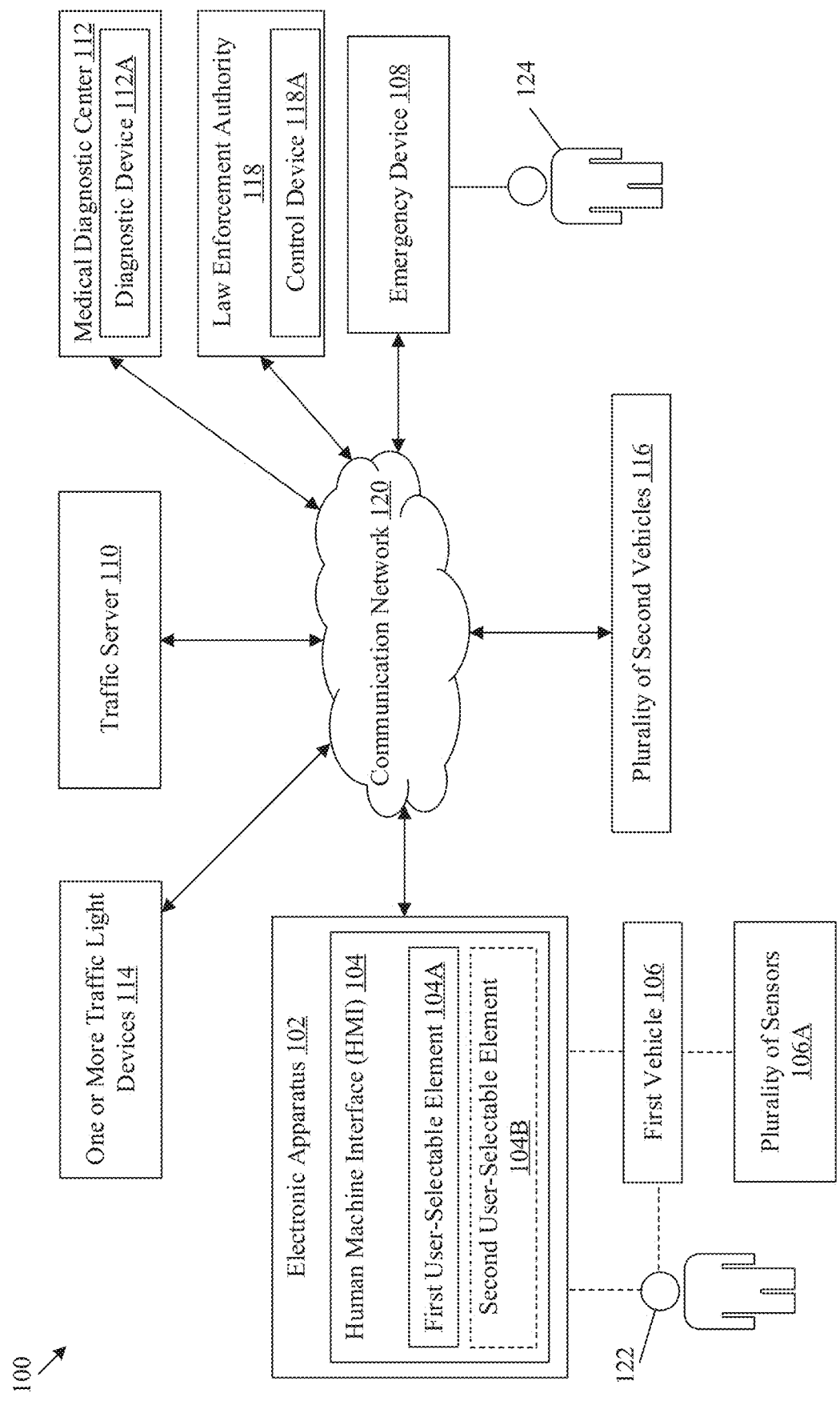
FIG. 1 is a block diagram that illustrates an exemplary network environment for emergency control for vehicle, in accordance with an embodiment of the disclosure.

The foregoing summary, as well as the following detailed description of the present disclosure, is better understood when read in conjunction with the appended drawings. For the purpose of illustrating the present disclosure, exemplary constructions of the preferred embodiment are shown in the drawings. However, the present disclosure is not limited to the specific methods and structures disclosed herein. The description of a method step or a structure referenced by a numeral in a drawing is applicable to the description of that method step or structure shown by that same numeral in any subsequent drawing herein.

DETAILED DESCRIPTION

The following described implementations may be found in a disclosed electronic apparatus for an emergency control for a vehicle. Exemplary aspects of the disclosure may provide an electronic apparatus (such as an electronic device associated with a vehicle or with an occupant of the vehicle) that may control a human machine interface (such as an infotainment system in the vehicle) associated with a first vehicle to display a first user-selectable element (such as an emergency icon). The first user-selectable element may be configured to enable an emergency mode of the first vehicle. In case of an emergency situation (such as a medical emergency) of an occupant (such as a driver or a passenger) associated with the first vehicle, the electronic apparatus may activate the first user-selectable element based on a first input received from the occupant or from an emergency detection system (for example a trained neural network model) in the first vehicle. The first input may correspond to a first selection (such as a selection of the first user-selectable element) which may indicate a request to enable an emergency mode.

Based on the first selection, the electronic apparatus may further control the human machine interface (HMI) to display a first option (such as a message prompt) to confirm the request to enable the emergency mode. The electronic apparatus may further receive a second input, which may correspond to a second selection of the displayed first option for the confirmation of the request. The first option may be provided to the occupant as a warning notification to enable the emergency mode. Thus, in case of a false-positive activation (such as an inadvertent activation of the first user-selectable element), the displayed human machine interface (HMI) controlled by the disclosed electronic apparatus may allow the occupant to cancel such request to avoid a fine or a penalty from an emergency authority for the false-positive activation. An inadvertent selection of the emergency mode may thereby be prevented.

Further, based on the second input, the electronic apparatus may activate a timer, associated with the electronic apparatus, for a pre-determined time period. The electronic apparatus may further establish a first communication with an emergency device (for example related to an emergency assistance authority or center) based on an expiration of the timer. The timer may facilitate a delay in processing the request to enable emergency mode, so that, in case of the false-positive activation, the displayed human machine interface (HMI) may allow the occupant may swiftly cancel such request during the pre-determined time period, to avoid the fine or the penalty for the false-positive activation. In other words, a time gap (i.e. provided by the timer) between the selection of the first option (as the confirmation to the emergency mode) and the establishment of communication with the emergency device may provide the occupant another chance to cancel the request for activation of the emergency mode, in case the activation done by a mistake.

Further, based on the established first communication with the emergency device, the electronic device may further control the human machine interface (HMI) to display a second option (such as a second user-selectable element that may be configured to terminate the established first communication). The electronic apparatus may further receive a third input, which may correspond to a third selection of the displayed second option for a termination of the request. Thus, even after the establishment of the first communication with the emergency device, the second option may be provided to the occupant for the termination of the request. Thus, in case of the false-positive activation, the displayed human machine interface (HMI) controlled by the disclosed electronic apparatus may allow the occupant to terminate the established connection to avoid the fine or the penalty for the false-positive activation.

Therefore, the disclosed electronic apparatus may provide a multi-layered protection (such as the first option as a first layer of protection, the timer as a second layer of protection, and the second option as a third layer of protection) for the occupant against the false-positive activation of the emergency mode. Based on the established first communication with the emergency device and confirmation on the emergency situation, the electronic apparatus may further deactivate the second user-selectable element (i.e. to avoid cancellation of the emergency mode after confirmation) and further receive one or more control instructions for the first vehicle or for the occupant from the emergency device to handle the emergency situation.

Reference will now be made in detail to specific aspects or features, examples of which are illustrated in the accompanying drawings. Wherever possible, corresponding, or similar reference numbers will be used throughout the drawings to refer to the same or corresponding parts.

FIG. 1 is a block diagram that illustrates an exemplary network environment for emergency control for a vehicle, in accordance with an embodiment of the disclosure. With reference to FIG. 1, there is shown a network environment 100 which may include an electronic apparatus 102, a first vehicle 106, an emergency device 108, a traffic server 110, a medical diagnostic center 112, one or more traffic light devices 114, a plurality of second vehicles 116, and a law enforcement authority 118. The electronic apparatus 102 may control (or include) a human machine interface 104 that may be associated with the first vehicle 106. The electronic apparatus 102 may be communicatively coupled with the emergency device 108, the traffic server 110, medical diagnostic center 112, the one or more traffic light devices 114, the plurality of second vehicles 116, and the law enforcement authority 118, through a communication network 120. The human machine interface 104 may display a first user-selectable element 104A and a second user-selectable element 104B for the emergency control for the first vehicle 106. There is further shown in the network environment 100, an occupant 122 associated with the first vehicle 106 and an operator 124 associated with the emergency device 108. The first vehicle 106 may include a plurality of sensors 106A to acquire information related to at least one of: vehicle information of the first vehicle 106 or occupant information of the occupant 122 associated with the first vehicle 106. The medical diagnostic center 112 may include a diagnostic device 112A that may be configured to communicate with the electronic apparatus 102 based on control instructions from the emergency device 108. The emergency device 108 may be associated with the operator 124 to generate the control instructions for the electronic apparatus 102. The law enforcement authority 118 may include a control device 118A to communicate with the electronic apparatus 102, through the communication network 120. Modifications, additions, or omissions may be made to FIG. 1 without departing from the scope of the present disclosure. For example, the network environment 100 may include more or fewer elements than those illustrated and described in the present disclosure. For instance, in some embodiments, the network environment 100 may not include the law enforcement authority 118 or the plurality of second vehicles 116, without deviation from the scope of the disclosure.

The electronic apparatus 102 may include suitable logic, circuitry, interfaces and/or code that may be configured to provide support for an emergency mode associated with the first vehicle 106. In an embodiment, the electronic apparatus 102 may control the human machine interface 104 to display the first user-selectable element 104A, which may be configured to enable the emergency mode associated with the first vehicle 106. Based on a first input, for example received from the occupant 122, through the first user-selectable element 104A, the electronic apparatus 102 may activate a timer for a pre-determined time period. The first input may be indicative of a request to enable the emergency mode. Further, the electronic apparatus 102 may control the human machine interface 104 to display the second user-selectable element 104B, which may be configured to cancel the request for the emergency mode associated with the first vehicle 106. The electronic apparatus 102 may be further configured to establish a first communication with the emergency device 108 based on an expiration of the timer. The electronic apparatus 102 may be configured to deactivate the second user-selectable element 104B based on the establishment of the first communication. The electronic apparatus 102 may be further configured to receive one or more control instructions for the first vehicle 106 from the emergency device 108 based on the established first communication.

The electronic apparatus 102 may be further configured to control the human machine interface 104 to provide information for the control of an emergency situation (such as medical emergency or accidents). For example, the information may include, but is not limited to, user-selectable elements to activate/cancel emergency mode, or control instructions to handle emergency situation. Details of such information are further described, for example, in FIGS. 4A-4F. The electronic apparatus 102 may further transmit notifications about the emergency situation to the plurality of second vehicles 116. Details of such notifications are further described, for example, in FIGS. 5A-5B.

In an embodiment, the electronic apparatus 102 may further control the one or more traffic light devices 114 to control a movement of the plurality of second vehicles 116 in a travel route of the first vehicle 106. In another embodiment, the electronic apparatus 102 may further notify a control device (e.g., the control device 118A) associated with the law enforcement authority 118 to clear the plurality of second vehicles 116 from the travel route of the first vehicle 106. Details of such control of the electronic apparatus 102 are further described, for example, in FIG. 6.

In an embodiment, the electronic apparatus 102 may be implemented as an in-vehicle infotainment system in the first vehicle 106. The in-vehicle infotainment system may include suitable logic, circuitry, interfaces and/or code that may be configured to present at least audio-based data, video-based data, and a user interface of the first vehicle 106. The in-vehicle infotainment system may execute one or more operations to provide, but not limited to, support for the emergency mode associated with the first vehicle 106 and control of the human machine interface 104. Examples of the in-vehicle infotainment system may include, but are not limited, an entertainment system, a navigation system, a vehicle user interface (UI) system, an Internet-enabled communication system, and other entertainment systems.

In some embodiments, the electronic apparatus 102 may be a computing device, which may include, but not limited to, a mainframe machine, a computer work-station, a desktop computer, and the like. In yet another embodiment, the electronic apparatus 102 may be a handheld or a portable device which may be present in the first vehicle 106. In such case, the examples of the electronic apparatus 102 may include, but are not limited to, a smartphone, a cellular phone, a mobile phone, a tablet computer, a laptop computer, and/or any electronic device with data processing and networking capabilities.

The human machine interface 104 may include suitable logic, circuitry, interfaces and/or code that may be configured to display user interface (including user-selectable elements) and the control instructions received from the emergency device at the time of the emergency mode. The human machine interface 104 may be a touch screen which may enable the occupant 122 to provide an input via the human machine interface 104. The touch screen may be at least one of: a resistive touch screen, a capacitive touch screen, or a thermal touch screen. For example, the human machine interface 104 may be realized through an infotainment panel associated with the electronic apparatus 102. In another example, the human machine interface 104 may be realized through a heads-up display associated with the first vehicle 106.

In another embodiment, the human machine interface 104 may be realized through several known technologies such as, but not limited to, at least one of: a Liquid Crystal Display (LCD) display, a Light Emitting Diode (LED) display, a plasma display, or an Organic LED (OLED) display technology, or other display devices associated with the human machine interface 104. In accordance with an embodiment, the human machine interface 104 may refer to a display screen of at least one of: a head mounted device (HMD), a smart-glass device, a see-through display, a projection-based display, an electro-chromic display, or a transparent display. In such cases, the human machine interface 104 may be operated by an input device (shown in FIG. 2), such as, but not limited to, a touch pad, a mouse, or a joystick. In an embodiment, the human machine interface 104 may display the first user-selectable element 104A and the second user-selectable element 104B.

The first user-selectable element 104A may be displayed as a suitable graphic, icon, image, or text on the human machine interface 104 and may be configured to initiate or enable an emergency mode of the first vehicle 106. In an embodiment, the first user-selectable element 104A may be configured to initiate a transmission of a request to the emergency device 108, to enable the emergency mode based on an incident associated with at least one of the first vehicle 106 or the occupant 122 associated with the first vehicle 106. For example, in case of the incident (such as a medical emergency for the occupant 122), the first user-selectable element 104A may receive the first input from the occupant 122 for transmission of the request to enable the emergency mode of the first vehicle 106. Examples of the first user-selectable element 104A may include, but not limited to, an icon, a button, a slider, a menu, or any other user-selectable element or graphical user interface (GUI) option that may be displayed through the human machine interface 104.

The second user-selectable element 104B may be displayed as a suitable graphic, icon, image, or text on the human machine interface 104 and may be configured to cancel the request to enable the emergency mode of the first vehicle 106. In an embodiment, the second user-selectable element 104B may be configured to initiate a cancellation of the request to enable the emergency mode. For example, in case of a false-positive activation (such as an inadvertent activation of the first user-selectable element 104A), the second user-selectable element 104B may initiate the cancellation of the request to enable the emergency mode of the first vehicle 106, based on a receipt of an input on the second user-selectable element 104B. Examples of the second user-selectable element 104B may include, but not limited to, an icon, a button, a slider, a menu or any other user-selectable element or graphical user interface (GUI) option that may be displayed through the human machine interface 104. Details of the human machine interface 104 are further described, for example, in FIGS. 4A-4F.

The first vehicle 106 may be a fully autonomous vehicle that may be capable to sense its environment and move safely with little or no occupant input. In an embodiment, the first vehicle 106 may be a level-5 autonomous vehicle that may be driven without any occupant input. In addition to the plurality of sensors 106A, in a specific embodiment, the first vehicle 106 may include at least one ranging system to perceive surroundings, such as a Radio Detection And Ranging (RADAR), a Light Detection and Ranging (LIDAR), a Sound Navigation And Ranging (SONAR), and the like.

In other embodiment, the first vehicle 106 may be a semi-autonomous vehicle, or a non-autonomous vehicle, for example, as defined by National Highway Traffic Safety Administration (NHTSA). Examples of the first vehicle 106 may include, but are not limited to, a two-wheeler vehicle, a three-wheeler vehicle, a four-wheeler vehicle, and the like. Examples of the two-wheeler vehicle may include, but are not limited to, an electric two-wheeler, an internal combustion engine (ICE) based two-wheeler, or a hybrid two-wheeler. Similarly, examples of the four-wheeler vehicle may include, but are not limited to, an electric car, an internal combustion engine (ICE) based car, a fuel-cell based car, a solar-powered car, or a hybrid car. It may be noted that the first vehicle 106 is merely shown as example in FIGS. 1, 3 and 6. The present disclosure may be also applicable to other types of vehicles. The description of other types of the vehicles has been omitted from the disclosure for the sake of brevity. In an embodiment, the first vehicle 106 may include the plurality of sensors 106A.

The plurality of sensors 106A associated with the first vehicle 106 may include suitable logic, circuitry, interfaces and/or code that may be configured to generate a plurality of signals associated with at least one of the first vehicle 106 or the occupant 122 associated with the first vehicle 106. For example, the plurality of sensors 106A may be configured to determine vehicle information of the first vehicle 106 by detection of at least one of: identification information, geo-location information, telematics information, or vehicle structural information of the first vehicle 106. Further, the plurality of sensors 106A may be configured to determine occupant information of the occupant 122 of the first vehicle 106 by detection of at least one of: one or more images, biometric information, emotional information, or audio information of the occupant 122. In an embodiment, the plurality of sensors 106A may generate the plurality of signals about the first vehicle 106 or about the occupant 122 and transmit the generated plurality of signals to the electronic apparatus 102. The electronic apparatus 102 may further determine the vehicle information and the occupant information based on the received plurality of signals. Examples of the plurality of sensors 106A may include, but not limited to, an image capturing device, an audio capturing device, a location sensing device, a speed sensing device, a biometric sensing device, and a proximity sensing device. In an embodiment, the plurality of sensors 106A may be located inside the first vehicle 106 or may be integrated in the electronic apparatus 102. In some embodiments, one or more of the plurality of sensors 106A may be located inside the first vehicle 106 and other may be integrated in the electronic apparatus 102. Details of the plurality of sensors 106A are further described, for example, in FIG. 3.

In certain embodiments, the plurality of sensors 106A may be remote with respect to the first vehicle 106 and the electronic apparatus 102, and may communicate with the electronic apparatus 102, through the communication network 120. The plurality of sensors 106A may remotely communicate the detected plurality of signals, associated with at least one of: the vehicle information or the occupant information, to the electronic apparatus 102. Examples of the remotely operated plurality of sensors 106A may include a traffic camera that may be disposed in the travel route of the first vehicle 106. The traffic camera may be capture one or more first images of the first vehicle 106 and/or one or more second images of the occupant 122 of the first vehicle 106. Examples of the remotely operated traffic camera may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices. Details of the remotely operated traffic camera are further described, for example, in FIG. 6.

The emergency device 108 may include suitable logic, circuitry, interfaces and/or code that may be configured to enable the emergency mode on the first vehicle 106. For example, the emergency device 108 may receive the request, to enable the emergency mode associated with the first vehicle 106, from the electronic apparatus 102. Based on the received request and an input from the operator 124 associated with the emergency device 108, the emergency device 108 may generate the one or more control instructions for the first vehicle 106. The emergency device 108 may further transmit the generated one or more control instructions to the electronic apparatus 102. Examples of the operator 124 associated with the emergency device 108 may include, but not limited to, a 911 operator, an S-O-S operator, a person capable to provide emergency related assistance or instructions. In an embodiment, the emergency device 108 may be a computing device, which may include, but not limited to, a mainframe machine, a computer work-station, a desktop computer, and the like. In another embodiment, the emergency device 108 may be a handheld or a portable device associated with the operator 124. In such case, the examples of the emergency device 108 may include, but are not limited to, a smartphone, a cellular phone, a mobile phone, a tablet computer, a laptop computer, and/or any electronic device with data processing, imaging, and networking capabilities.

The traffic server 110 may include suitable logic, circuitry, interfaces and/or code that may be configured to provide traffic information to the electronic apparatus 102 associated with the first vehicle 106. In an embodiment, the traffic information may include information about movement of the plurality of second vehicles 116 in the travel route of the first vehicle 106. Based on the traffic information, the electronic apparatus 102 may be configured to change the travel route. Details of the change in the travel route are further described, for example, in FIG. 4F.

In an embodiment, the traffic server 110 may be a cloud server, which may be utilized to execute various operations through web applications, cloud applications, HTTP requests, repository operations, file transfer, and the like. Examples of the traffic server 110 may include, but are not limited to, a database server, an event server, a file server, a web server, a media server, a content server, an application server, a mainframe server, or a combination thereof. In one or more embodiments, the traffic server 110 may be implemented as a plurality of distributed cloud-based resources. In another embodiment, the traffic server 110 may be a computing device, which may include, but not limited to, a mainframe machine, a computer work-station, a desktop computer, and the like. In yet another embodiment, the traffic server 110 may be a handheld or a portable device. In such case, the examples of the traffic server 110 may include, but are not limited to, a smartphone, a cellular phone, a mobile phone, a tablet computer, a laptop computer, and/or any electronic device with data processing and networking capabilities.

The medical diagnostic center 112 may be an entity who may be responsible to communicate or provide medical assistance information to the electronic apparatus 102 associated with the first vehicle 106. In an embodiment, the electronic apparatus 102 may transmit health status information about the occupant 122 of the first vehicle 106 to the medical diagnostic center 112. Based on the health status information, the medical diagnostic center 112 may generate the medical assistance information. In an embodiment, the medical diagnostic center 112 may include the diagnostic device 112A to communicate with the electronic apparatus 102, through the communication network 120. Examples of the medical diagnostic center 112 may include, but is not limited to, a hospital, an ambulance service, a medical assistance center, a health care center, and the like.

The diagnostic device 112A may include suitable logic, circuitry, interfaces and/or code that may be configured to receive the health status information about the occupant 122 of the first vehicle 106. Based on the received health status information, the diagnostic device 112A may transmit the medical assistance information that may be generated from the medical diagnostic center 112. Details of such medical assistance information are further explained, for example, in FIG. 4F. In an embodiment, the diagnostic device 112A may be a computing device, which may include, but not limited to, a mainframe machine, a computer work-station, a desktop computer, and the like. In yet another embodiment, the diagnostic device 112A may be a handheld or a portable device. In such case, the examples of the diagnostic device 112A may include, but are not limited to, a smartphone, a cellular phone, a mobile phone, a tablet computer, a laptop computer, and/or any electronic device with data processing and networking capabilities.

The one or more traffic light devices 114 may include suitable logic, circuitry, and/or interfaces that may be configured to control an illumination of the one or more traffic light devices 114 situated on a travel route, to control the movement of the first vehicle 106 and the plurality of second vehicles 116 to clear the travel route of the first vehicle 106. Details on the control provided by the one or more traffic light devices 114 are further explained, for example, in FIG. 6. Examples of the one or more traffic light devices 114 may include, but not limited to, fixed time traffic light devices, manually operated traffic light devices, traffic actuated light devices, a traffic light controller, and the like.

Each of the plurality of second vehicles 116 may be a fully autonomous vehicle that may be capable to sense its environment and move safely with little or no occupant input. In an embodiment, one of the plurality of second vehicles 116 may be a level-5 autonomous vehicle that may be driven without any occupant input. In an embodiment, the plurality of second vehicles 116 may include at least one ranging system to perceive surroundings, such as a Radio Detection And Ranging (RADAR), a Light Detection and Ranging (LIDAR), a Sound Navigation And Ranging (SONAR), and the like.

In other embodiment, each of the plurality of second vehicles 116 may be a semi-autonomous vehicle, or a non-autonomous vehicle, for example, as defined by National Highway Traffic Safety Administration (NHTSA). Examples of the first vehicle 106 may include, but are not limited to, a two-wheeler vehicle, a three-wheeler vehicle, a four-wheeler vehicle, and the like. Examples of the two-wheeler vehicle may include, but are not limited to, an electric two-wheeler, an internal combustion engine (ICE) based two-wheeler, or a hybrid two-wheeler. Similarly, examples of the four-wheeler vehicle may include, but are not limited to, an electric car, an internal combustion engine (ICE) based car, a fuel-cell based car, a solar-powered car, or a hybrid car. It may be noted here that the plurality of second vehicles 116 is merely shown as examples in FIGS. 1, and 6. The present disclosure may be also applicable to other types of vehicles. The description of other types of the vehicles has been omitted from the disclosure for the sake of brevity.

The law enforcement authority 118 may be an entity (for example a traffic police) which may be responsible to clear the plurality of second vehicles 116 from the travel route of the first vehicle 106, based on instructions from the electronic apparatus 102. In an embodiment, the law enforcement authority 118 may receive at least one of: the traffic information of the travel route or emergency information of the occupant 122 of the first vehicle 106 from the electronic apparatus 102. Based on the at least one: the traffic information or the emergency information, the law enforcement authority 118 may generate traffic clearance instructions. The traffic clearance instructions may relate to the control of movement of the plurality of second vehicles 116 in the travel route of the first vehicle 106. In an embodiment, the law enforcement authority 118 may include the control device 118A to execute or communicate the traffic clearance instructions.

The control device 118A may include suitable logic, circuitry, interfaces and/or code that may be configured to execute or communicate the traffic clearance instructions for the first vehicle 106. Based on the execution of the traffic clearance instructions, the control device 118A may communicate with the plurality of second vehicles 116 to clear the travel route of the first vehicle 106. Details of such execution and communication of the traffic clearance instructions are further explained, for example, in FIG. 6. In an embodiment, the control device 118A may be a computing device, which may include, but not limited to, a mainframe machine, a computer work-station, a desktop computer, and the like. In yet another embodiment, the control device 118A may be a handheld or a portable device. In such case, the examples of the control device 118A may include, but are not limited to, a smartphone, a cellular phone, a mobile phone, a tablet computer, a laptop computer, and/or any electronic device with data processing and networking capabilities.

The communication network 120 may include a communication medium through which the electronic apparatus 102, the emergency device 108, the traffic server 110, the medical diagnostic center 112, the one or more traffic light devices 114, the plurality of second vehicles 116, and the control device 118A of the law enforcement authority 118 may communicate with each other. The communication network 120 may be one of a wired connection or a wireless connection. Examples of the communication network 120 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 120 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols. In an example, the communication network 120 may include a star topology that may be configured to collaborate with components in the network environment 100 as shown in FIG. 1. It may be noted that the star topology shown in FIG. 1 is presented merely as an example of the network environment 100. The present disclosure may be also applicable to other types of communication network 120 such as a bus topology, a ring topology, etc. The description of other types of communication network 120 has been omitted from the disclosure for the sake of brevity.

In operation, the electronic apparatus 102 may control the human machine interface 104 associated with the first vehicle 106 to display the first user-selectable element 104A. In an embodiment, the first user-selectable element 104A (for example an icon) may be configured to enable, initiate, or request for the emergency mode of the first vehicle 106. For example, the emergency mode may include a process to receive control instructions, such as emergency assistance information for the first vehicle 106 or the occupant 122. Details of such control instructions further described, for example in FIGS. 4A-4F.

The electronic apparatus 102 may further receive the first input, which may correspond to a first selection of the displayed first user-selectable element 104A. In an embodiment, the first selection may indicate the request to enable the emergency mode. For example, the first selection may include a selection of the first user-selectable element 104A. Based on the selection, the human machine interface 104 may indicate the request to enable the emergency mode to the electronic apparatus 102. Details of such indication are further described, for example, in FIGS. 4A-4B.

The electronic apparatus 102 may further activate a timer (shown in FIG. 2), associated with the electronic apparatus 102, for a pre-determined time period based on the received first input. In an embodiment, the timer may be integrated with the electronic apparatus 102 and activated based on the first input received from the occupant 122. In another embodiment, the timer may be remotely coupled with the electronic apparatus 102, via the communication network 120, and activated based on the first input of the occupant 122. Details of the timer are further described, for example in FIGS. 2 and 4C.

The electronic apparatus 102 may further establish a first communication (such as a video call, a voice call, and the like) with the emergency device 108 associated with the first vehicle 106 for the emergency mode, based on an expiration of the timer. For example, the electronic apparatus 102 may establish the first communication to transmit the request to the emergency device 108. Details of the establishment of the first communication are further explained, for example, in FIGS. 4D-4E.

The electronic apparatus 102 may further deactivate the second user-selectable element 104B on the human machine interface 104 based on the established first communication with the emergency device 108. In an embodiment, the second user-selectable element 104B may be configured to cancel the request to enable the emergency mode for the first vehicle 106. Details of the second user-selectable element 104B are further explained, for example in FIGS. 4D-4E.

The electronic apparatus 102 may further receive one or more control instructions for the first vehicle 106 from the emergency device 108 based on the established first communication. Details of the one or more control instructions are further explained, for example in FIGS. 4F, 5, and 6.

The disclosed electronic apparatus 102 may activate the timer for the pre-determined time on receipt of the first input to enable the emergency mode, which may be received from the occupant 122, through the first user-selectable element 104A. In case of a false-positive activation (such as an inadvertent activation of the first user-selectable element 104A), the electronic apparatus 102 may cancel the request based on the timer being active and a receipt of a user input from the occupant 122 for cancelation of the request through the second user-selectable element 104B. Thus, even after the receipt of the request to enable of the emergency mode through the first user-selectable element 104A, the electronic apparatus 102 may provide the occupant 122 with an opportunity to cancel the request through the second user-selectable element 104B within the pre-determined time for which the timer may be activated. Thus, in case of a false-positive activation (such as an inadvertent activation of the first user-selectable element), the occupant 122 may cancel such request to avoid a fine or a penalty from the law enforcement authority 118 or an entity related to the emergency device 108 for the false-positive activation. An inadvertent selection or activation of the emergency mode may thereby be prevented.

Figure 2:
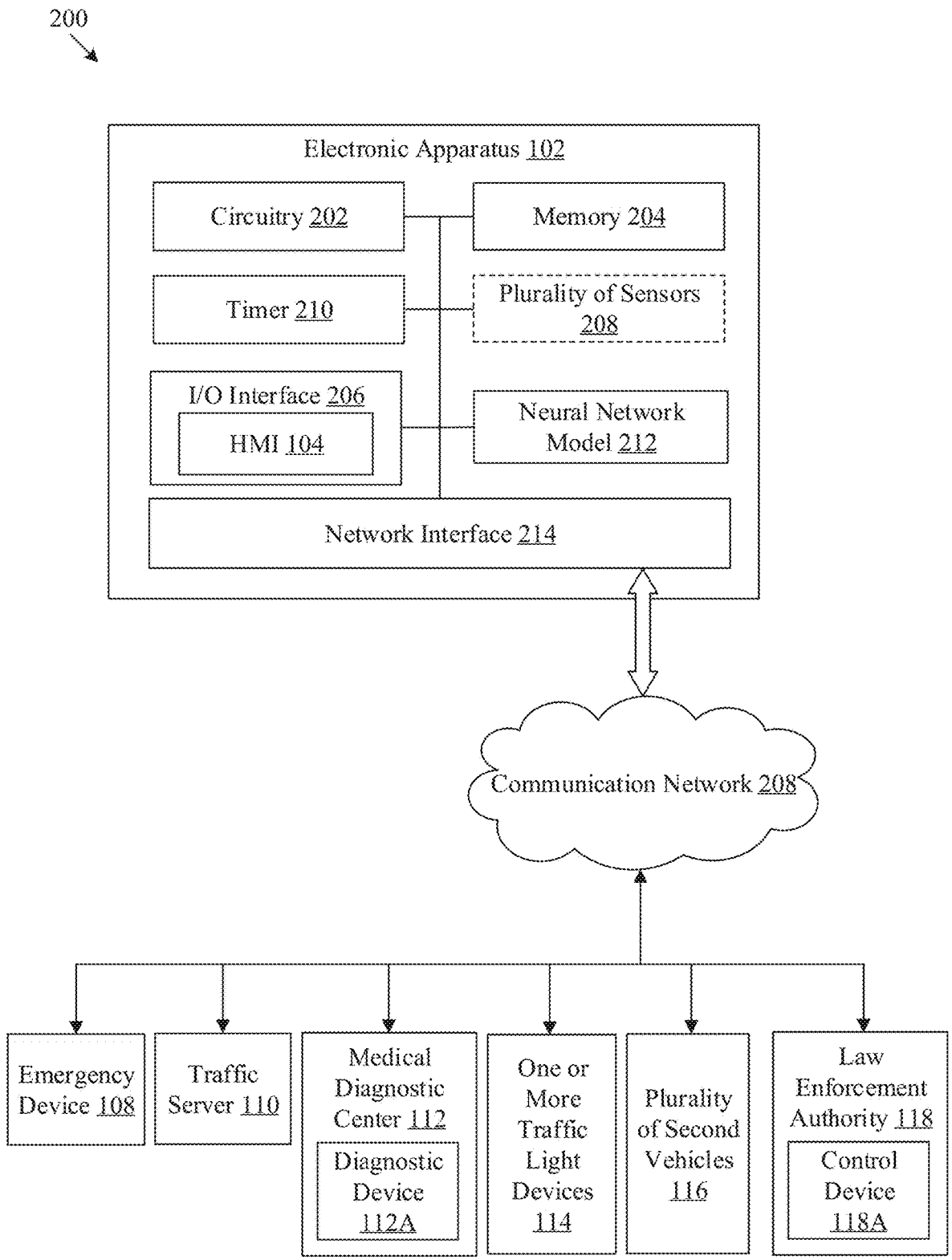
FIG. 2 is a block diagram that illustrates an exemplary electronic apparatus for emergency control for vehicle, in accordance with an embodiment of the disclosure.

FIG. 2 is a block diagram that illustrates an exemplary electronic apparatus for an emergency control for a vehicle, in accordance with an embodiment of the disclosure. FIG. 2 is explained in conjunction with elements from FIG. 1. With reference to FIG. 2, there is shown a block diagram 200 of the electronic apparatus 102. The electronic apparatus 102 may include circuitry 202, a memory 204, an input/output (I/O) interface 206, a plurality of sensors 208, a timer 210, a neural network model 212, and a network interface 214. The circuitry 202 may be communicatively coupled to the memory 204, the I/O interface 206, the plurality of sensors 208, the timer 210, the neural network model 212, and the network interface 214. The functions of the plurality of sensors 208 shown in FIG. 2 may be same as the functions of the plurality of sensors 106A shown in FIGS. 1 and 3. Therefore, the description of the plurality of sensors 208 is omitted from FIG. 3 for the sake of brevity. Though the plurality of sensors 208 are shown in FIG. 2 as a part of the electronic apparatus 102, in some embodiments, the plurality of sensors 208 may be separate from the electronic apparatus 102 and may be associated with or located in the first vehicle 106. In another embodiment, the plurality of sensors 208 may be remote from the first vehicle 106 and may be communicatively coupled to the electronic apparatus 102 through the communication network 120. The electronic apparatus 102 may be configured to communicate between at least one of: the emergency device 108, the traffic server 110, the medical diagnostic center 112, the one or more traffic light devices 114, the plurality of second vehicles 116, or the control device 118A of the law enforcement authority 118, through the communication network 120.

The circuitry 202 may include suitable logic, circuitry, and/or interfaces that may be configured to execute program instructions associated with different operations to be executed by the electronic apparatus 102. For example, some of the operations may include, but are not limited to, control of the human machine interface 104 to display the first user-selectable element 104A, reception of the first input that may correspond to the first selection of the displayed first user-selectable element 104A, activation of the timer 210 for the pre-determined time period, establishment of the first communication with the emergency device 108 based on the expiration of the timer 210, deactivation of the second user-selectable element 104B on the human machine interface 104 based on the established first communication, and reception of the one or more control instructions for the first vehicle 106 from the emergency device 108 based on the established first communication. The execution of operations are further explained, for example, in FIGS. 4A-4F.

The circuitry 202 may include any suitable special-purpose or general-purpose computer, computing entity, or processing device including various computer hardware or software modules and may be configured to execute instructions stored on any applicable computer-readable storage media (for example the memory 204). The circuitry 202 may be implemented based on a number of processor technologies known in the art. For example, the circuitry 202 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. The circuitry 202 may include any number of processors configured to, individually or collectively, perform any number of operations of the electronic apparatus 102, as described in the present disclosure. Examples of the circuitry 202 may include a Central Processing Unit (CPU), a Graphical Processing Unit (GPU), an x86-based processor, an x64-based processor, a Reduced Instruction Set Computing (RISC) processor, a Complex Instruction Set Computing (CISC) processor, and/or other hardware processors.

The memory 204 may include suitable logic, circuitry, interfaces, and/or code that may be configured to store the set of instructions executable by the circuitry 202. The memory 204 may be configured to store information associated with request for the predetermined time period of the timer 210. In an embodiment, the memory 204 may be further configured to store the neural network model 212. The memory 204 may store the vehicle information or the occupant 122 information generated based on the signals provided from the plurality of sensors 208 or provided from the occupant 122, via the human machine interface 104. In an embodiment, the memory 204 may store the one or more control instructions received from the emergency device 108 for the emergency mode. Examples of implementation of the memory 204 may include, but are not limited to, Random Access Memory (RAM), Read Only Memory (ROM), Hard Disk Drive (HDD), a Solid-State Drive (SSD), a CPU cache, and/or a Secure Digital (SD) card.

The I/O interface 206 may include suitable logic, circuitry, interfaces, and/or code that may be configured to receive input from the occupants (e.g., the occupant 122) and render output in response to the received input from the occupants. In an embodiment, the I/O interface 206 may be integrally coupled to the human machine interface 104 to receive an input from the occupant 122. In some embodiments, the I/O interface 206 may include the human machine interface 104. In other embodiment, the I/O interface 206 may include various input and output devices, that may be configured to communicate with the circuitry 202. Examples of the such input and output devices may include, but are not limited to, a touch screen, a keyboard, a mouse, a joystick, a microphone, a display device, a speaker, and/or an image sensor.

The timer 210 may include suitable logic, circuitry, interfaces, and/or code that may be configured to generate a delay in the transmission of the request (i.e. to enable the emergency mode from) the electronic apparatus 102 to the emergency device 108. In an embodiment, the delay may be generated for the predetermined time period set by the timer 210 of the electronic apparatus 102. In an example, the timer 210 may include a digital counter or clock to count time up to the predetermined time period and may expire once the predetermined time period may be reached. Examples of the timer 210 may include, but not limited to, a software timer, a digital clock, or an internal clock associated with the electronic apparatus 102. In an embodiment, the electronic apparatus 102 may activate the timer 210 for the predetermined time period based on the received first input. Details of the activation of the timer 210 are further explained, for example, in FIG. 4C.

The neural network model 212 may include suitable logic, circuitry, interfaces, and/or code that may be configured to determine an emergency state of the first vehicle 106. In an embodiment, the electronic apparatus 102 or the circuitry 202 associated with the electronic apparatus 102 may control the neural network model 212 to determine the emergency state of the first vehicle 106 based on the at least one of: the vehicle information of the first vehicle 106 or the occupant information of the occupant 122 of the first vehicle 106. For example, based on the vehicle structural information (i.e. such as physical condition or damages) in the vehicle information or one or more images of the occupant 122 in the occupant information, the neural network model 212 may determine the emergency state of the first vehicle 106. The electronic apparatus 102 may further receive the first input, which may correspond to the first selection of the displayed first user-selectable element 104A based on the determined emergency state of the first vehicle 106. Thus, even without any input from the occupant 122, the neural network model 212 may directly initiate the request to enable the emergency mode based on the determined emergency state of the first vehicle 106.

In an embodiment, the electronic apparatus 102 may transmit information about the emergency state determined by the neural network model 212 to the emergency device 108, based on the established first communication with the emergency device 108. The electronic apparatus 102 may further receive emergency confirmation information from the emergency device 108 based on the transmitted information about the emergency state. The electronic apparatus 102 may further deactivate the second user-selectable element 104B on the human machine interface based on the received emergency confirmation information from the emergency device 108. The electronic apparatus 102 may further receive the one or more control instructions for the first vehicle 106 from the emergency device 108 based on the received emergency confirmation information. Details of the one or more control instructions are further explained, for example, in FIG. 4F.

The neural network model 212 may include electronic data, such as, for example, a software program, code of the software program, libraries, applications, scripts, or other logic or instructions for execution by a processing device, such as the circuitry 202. The neural network model 212 may include code and routines configured to enable a computing device or a processor, such as the circuitry 202 to perform one or more operations for classification of one or more inputs into the emergency vehicle notification. Additionally or alternatively, the neural network model 212 may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model 212 may be implemented using a combination of hardware and software.

In an embodiment, the neural network model 212 may be a computational network or a system of artificial neurons, arranged in a plurality of layers, as nodes. The plurality of layers of the neural network model 212 may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model 212. Outputs of each hidden layer may be coupled to inputs of at least one node in other layers of the neural network model 212. Node(s) in the final layer may receive inputs from at least one hidden layer to output a result. The number of layers and the number of nodes in each layer may be determined from hyper-parameters of the neural network model 212. Such hyper-parameters may be set before or while training the neural network model 212 on a training dataset.

In another embodiment, each node of the neural network model 212 may correspond to a mathematical function (e.g., a sigmoid function or a rectified linear unit) with a set of parameters, tunable during training of the network. The set of parameters may include, for example, a weight parameter, a regularization parameter, and the like. Each node may use the mathematical function to compute an output based on one or more inputs from nodes in other layer(s) (e.g., previous layer(s)) of the neural network model 212. All or some of the nodes of the neural network model 212 may correspond to same or a different same mathematical function.

In training of the neural network model 212, one or more parameters of each node of the neural network model 212 may be updated based on whether an output of the final layer for a given input (from the training dataset) matches a correct result based on a loss function for the neural network model 212. The above process may be repeated for same or a different input till a minimal of loss function may be achieved and a training error may be minimized. Several methods for training are known in art, for example, gradient descent, stochastic gradient descent, batch gradient descent, gradient boost, meta-heuristics, and the like.

Examples of the neural network model 212 may include, but are not limited to, a deep neural network (DNN), a convolutional neural network (CNN), a recurrent neural network (RNN), a CNN-recurrent neural network (CNN-RNN), R-CNN, Fast R-CNN, Faster R-CNN, an artificial neural network (ANN), (You Only Look Once) YOLO network, a Long Short Term Memory (LSTM) network based RNN, CNN+ANN, LSTM+ANN, a gated recurrent unit (GRU)-based RNN, a fully connected neural network, a Connectionist Temporal Classification (CTC) based RNN, a deep Bayesian neural network, a Generative Adversarial Network (GAN), and/or a combination of such networks. In some embodiments, the neural network model 212 may include numerical computation techniques using data flow graphs. In certain embodiments, the neural network model 212 may be based on a hybrid architecture of multiple Deep Neural Networks (DNNs).

The network interface 214 may include suitable logic, circuitry, interfaces, and/or code that may be configured to facilitate communication between the circuitry 202, the emergency device 108, the traffic server 110, the diagnostic device 112A of the medical diagnostic center 112, the one or more traffic light devices 114, the plurality of second vehicles 116, and the control device 118A of the law enforcement authority 118, via the communication network 120. The network interface 214 may be implemented by use of various known technologies to support wired or wireless communication of the electronic apparatus 102 with other devices of the network environment 100, via the communication network 120. The network interface 214 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 214 may be configured to communicate via wireless communication with networks, such as the Internet, an Intranet or a wireless network, such as a cellular telephone network, a wireless local area network (LAN), and a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

Although in FIG. 2, it is shown that the electronic apparatus 102 includes the circuitry 202, the memory 204, the I/O interface 206, the plurality of sensors 208, timer 210, the neural network model 212, and the network interface 214, the disclosure may not be so limited and the electronic apparatus 102 may include more or less components to perform the same or other functions of the electronic apparatus 102. Details of the other functions and the components have been omitted from the disclosure for the sake of brevity. The functions or operations executed by the electronic apparatus 102, as described in FIG. 1, may be performed by the circuitry 202 for the emergency control for the first vehicle 106. The components associated with the first vehicle 106 are further explained, for example, in FIG. 3.

Figure 3:
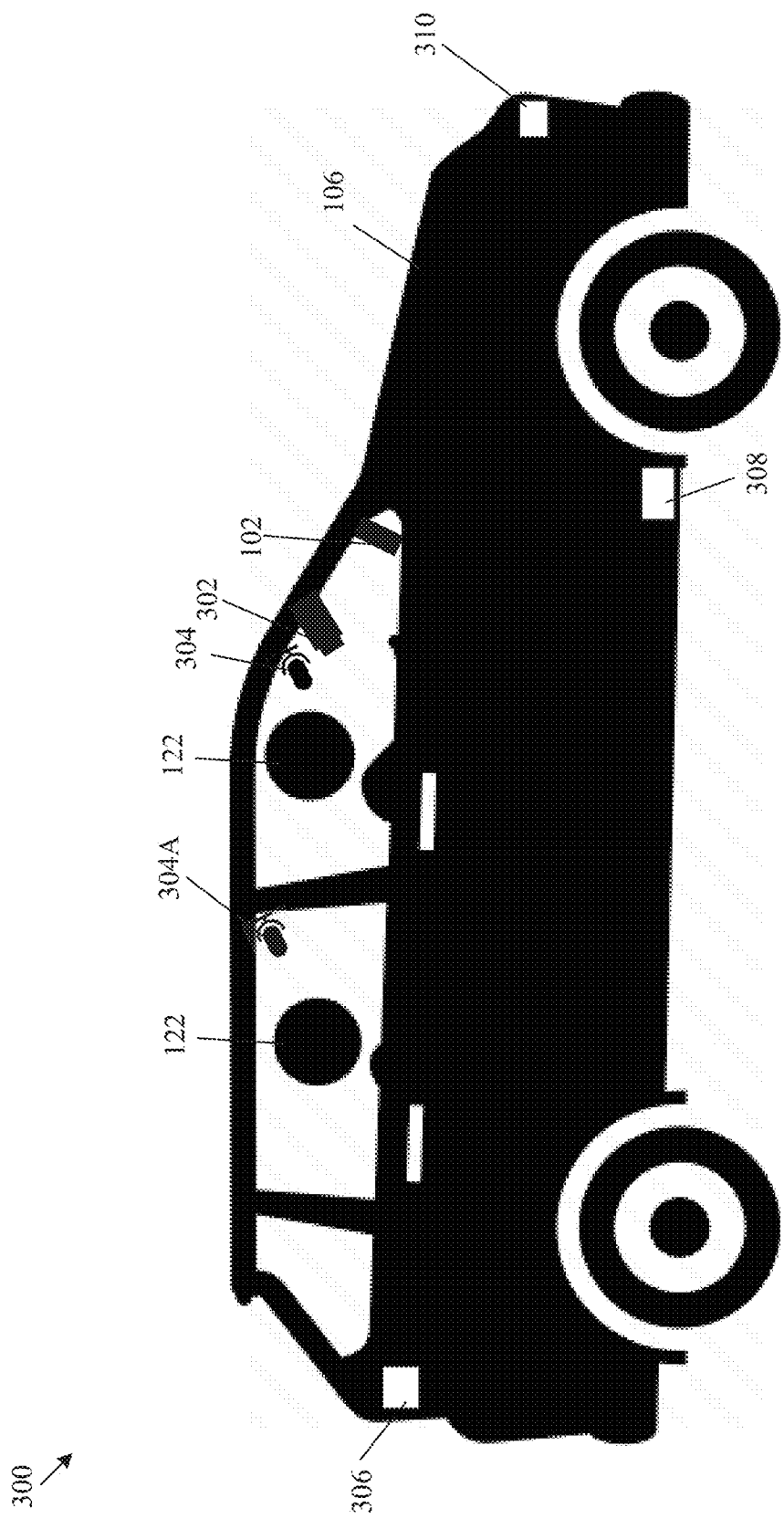
FIG. 3 is a diagram that illustrates an exemplary scenario of a first vehicle provided with the electronic apparatus of FIG. 1, for emergency control for the first vehicle, in accordance with an embodiment of the disclosure.

FIG. 3 is a diagram that illustrates an exemplary scenario of a vehicle provided with the electronic apparatus of FIG. 1, for emergency control for the first vehicle, in accordance with an embodiment of the disclosure. FIG. 3 is explained in conjunction with elements from FIG. 1 and FIG. 2. With reference to FIG. 3, there is shown an exemplary scenario 300 of the first vehicle 106 that may be provided with the electronic apparatus 102 of FIG. 1. The first vehicle 106 may include the plurality of sensors 106A such as, but not limited to, an image capturing device 302, an audio capturing device 304, a location sensing device 306, a speed sensing device 308, and a proximity sensing device 310.

The image capturing device 302 may include suitable logic, circuitry, and/or interfaces that may be configured to capture at least one image of: a part of the first vehicle 106 or the occupant 122 of the first vehicle 106. In an embodiment, the electronic apparatus 102 may be communicably coupled with the image capturing device 302 of the first vehicle 106 and further control the image capturing device 302 to capture the at least one image. The electronic apparatus 102 may further determine the at least one of: the vehicle information of the first vehicle 106 or the occupant information of the occupant 122 of the first vehicle 106 based on the at least one image captured by the image capturing device 302. For example, the vehicle information of the first vehicle 106 may include at least one of: identification information, or vehicle structural information. In another example, the occupant information of the occupant 122 of the first vehicle 106 may include one or more images of the occupant 122, the biometric information, and the emotional information of the occupant 122. Examples of the image capturing device 302 may include, but are not limited to, an image sensor, a wide-angle camera, an action camera, a closed-circuit television (CCTV) camera, a camcorder, a digital camera, camera phones, a time-of-flight camera (ToF camera), a night-vision camera, and/or other image capture devices.

The image capturing device 302 may be configured to capture a plurality of images of the occupant 122 over a specified time period. The captured plurality of images may be utilized to determine a facial expression of the occupant 122. The facial expression may indicate one or more motions or positions of muscles of a face of the occupant 122, where the facial expressions may manifest an emotion. The muscles of the face may move the skin of the occupant 122, may create facial lines/folds, or may cause the movement of facial features, such as mouth, head, nose, eye, eyebrows of the occupant 122. The electronic apparatus 102 may be configured to determine the emotional information of the occupant 122 based on the determined facial expression of the occupant 122. The plurality of categories of the emotional information may include, but are not limited to, a happy emotion, a sad emotion, an angry emotion, a calm emotion, a fear emotion, a neutral emotion, an excited emotion, a confused emotion, a stressed emotion, a disgusted emotion, a surprised emotion, an excitement emotion, or a scared emotion. The occupant information may include the determined emotional information.

The audio capturing device 304 may include suitable logic, circuitry, and/or interfaces that may be configured to capture at least one audio sample from the first vehicle 106. In an embodiment, the electronic apparatus 102 may be communicably coupled with the audio capturing device 304 of the first vehicle 106 to capture the at least one audio sample of the occupant 122 of the first vehicle 106. The electronic apparatus 102 may further determine audio information (i.e. included in the occupant information) based on the at least one audio sample of the occupant 122 that may be captured through the audio capturing device 304. In some embodiments, there may be at least one secondary audio capturing device 304A that may be configured to capture the at least one sample from one or more occupants (such as passengers) of the first vehicle 106. In an embodiment, the audio capturing device 304 may further convert the captured at least one audio sample into an electrical signal for the electronic apparatus 102 to determine the occupant information. Examples of the audio capturing device 304 may include, but are not limited to, a recorder, an electret microphone, a dynamic microphone, a carbon microphone, a piezoelectric microphone, a fiber microphone, a (micro-electro-mechanical-systems) MEMS microphone, or other microphones known in the art.

The location sensing device 306 may include suitable logic, circuitry, and/or interfaces that may be configured to detect a current geo-location of the first vehicle 106. In an embodiment, the current geo-location of the first vehicle 106 may be determined based on triangulation information associated with the first vehicle 106. For example, the triangulation information may relate to information associated with a location of a radio transmitter (not shown) that may be associated with the first vehicle 106. The location sensing device 306 may transmit the detected current geo-location of the first vehicle 106 to the electronic apparatus 102. Examples of the location sensing device 306, may include, but are not limited to, a Global Navigation Satellite System (GNSS)-based sensor of the first vehicle 106. Examples of the GNSS-based sensor may include, but are not limited to, global positioning sensor (GPS), Global Navigation Satellite System (GLONASS), or other regional navigation systems or sensors. Details of the location sensing device 306 are further described, for example, in FIGS. 4A and 4F.

The speed sensing device 308 may include suitable logic, circuitry, and/or interfaces that may estimate a speed of the first vehicle 106 in a direction (such as the travel route) of the movement of the first vehicle 106. The speed of the first vehicle 106 may be determined based on a linear displacement of the first vehicle 106 or an angular displacement of a front wheel of the first vehicle 106. For example, the speed sensing device 308 may estimate the speed of the first vehicle 106 based on a rate of change of the current geo-location of the first vehicle 106. Examples of the speed sensing device 308 may include, but are not limited to, Hall effect sensors, variable reluctance speed sensors, Radio Frequency (RF) speed sensors, Amplified (Active) speed sensors, Light Detection and Ranging (LiDAR) speed sensors, accelerometer-based speed sensors, optical speed sensors, and Antilock Braking System (ABS) speed sensors. In some embodiments, the speed sensing device 308 may detect the speed based on engine revolutions, gear ratio, wheel rotation, and the like. Details of the speed sensing device 308 are further described, for example, in FIGS. 4A and 4F.

The proximity sensing device 310 may include suitable logic, circuitry, and/or interfaces that may be configured to detect a proximity between the first vehicle 106 and the plurality of second vehicles 116 in the travel route. In an embodiment, the proximity sensing device 310 may detect the proximity based on one of: an electromagnetic field source, a light source, or an acoustical source. Examples of the proximity sensing device may include, but not limited to, a Hall-effect sensor, an optical sensor, an infra-red/thermal sensor, or an ultrasonic sensor. Details of the proximity sensing device are further described, for example in FIG. 5.

In addition to the image capturing device 302, the audio capturing device 304, the location sensing device 306, the speed sensing device 308, and the proximity sensing device 310, there may also be other sensors, such as a biometric sensing device (not shown in FIG. 3) that may capture the biometric information of the occupant 122. In an embodiment, the biometric sensing device may include suitable logic, circuitry, and/or interfaces that may be configured to capture the biometric information associated with one or more occupants (e.g., the occupant 122) of the first vehicle 106. Examples of the biometric information associated with the occupant 122 may include, but is not limited to, body temperature, heartbeat, electrocardiogram (ECG), pulse rate, iris patterns, facial images, or voice samples associated with the occupant 122. Examples of the biometric sensing device may include, but is not limited to, a temperature sensor, heartbeat sensor, ECG sensor, an iris scanner, a facial detection sensor, or an audio capture and analysis device.

It may be noted here that the positions, arrangements, or shapes of the plurality of sensors 106A such as, the image capturing device 302, the audio capturing device 304, the location sensing device 306, the speed sensing device 308, and the proximity sensing device 310 shown in FIG. 3 is merely an example. The present disclosure may be also applicable to other positions, arrangements, shapes, or structure of the plurality of sensors 106A, without a deviation from scope of the disclosure.

Figure 4A:
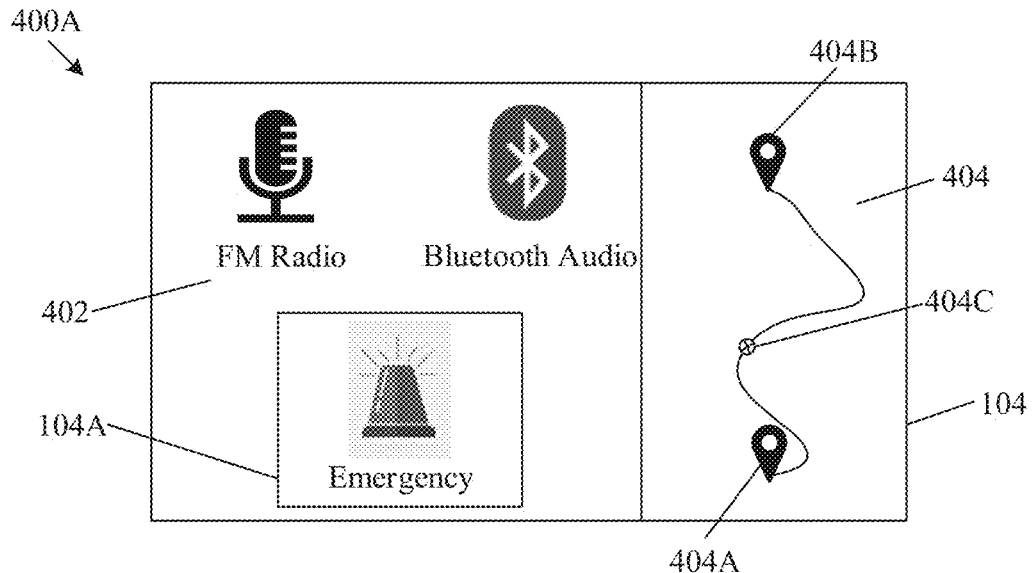
FIG. 4A is a diagram that illustrates an exemplary human machine interface (HMI) of the electronic apparatus of FIG. 1 to provide an emergency request to the electronic apparatus, in accordance with an embodiment of the disclosure.

FIG. 4A is a diagram that illustrates an exemplary human machine interface (HMI) of the electronic apparatus of FIG. 1 to provide an emergency request to the electronic apparatus, in accordance with an embodiment of the disclosure. FIG. 4A is explained in conjunction with elements from FIG. 1, FIG. 2, and FIG. 3. With reference to FIG. 4A, there is shown an exemplary first scenario 400A to display an option in the human machine interface 104 to activate an emergency request.

There is shown in the first scenario 400A, the human machine interface 104 of the electronic apparatus 102. In an embodiment, the electronic apparatus 102 may control the human machine interface 104 to display at least one of a plurality of user-selectable elements 402 or first navigation information 404, as shown in the first scenario 400A. The plurality of user-selectable elements 402 may include, but not limited to, a FM radio element, a Bluetooth® audio element, and the first user-selectable element 104A. The FM radio element may be configured to initiate an FM radio playback in the first vehicle 106 on selection of the FM radio element by the occupant 122. The Bluetooth® audio element may be configured to initiate a playback of audio associated with a wirelessly connected electronic device (not shown), based on a selection of the Bluetooth® audio element by the occupant 122. The electronic device may be connected with the electronic apparatus 102 through a Bluetooth® network. Details of the FM radio element and the Bluetooth® audio element have been omitted from the disclosure for the sake of brevity. It may be noted that the plurality of user-selectable elements 402 displayed on the human machine interface 104 in FIG. 4A is merely presented as an example. The human machine interface 104 may include other user selectable elements as per features provided by other vehicles, without a deviation from scope of the disclosure.

The first navigation information 404 may include information related to the travel route of the first vehicle 106. For example, the first navigation information 404 may include a starting point 404A and a destination point 404B of the travel route of the first vehicle 106. The starting point 404A may relate to a point of start of a trip of the first vehicle 106. The destination point 404B may relate to a point of end of the trip of the first vehicle 106. At times, there might be incidents or emergency that may occur when the occupant 122 travels from the starting point 404A to the destination point 404B, through the first vehicle 106. For example, the occupant 122 may experience a medical emergency (such as a heart attack, a seizure, accidents, and the like) during the travel, for example, at an incident point 404C. In such case, the occupant 122 may activate the emergency request to enable the emergency mode based on the medical emergency, via the first user-selectable element 104A displayed on the human machine interface 104. In another embodiment, the neural network model 212 associated with the first vehicle 106 may analyze at least one of: the vehicle information associated with the first vehicle 106 or the occupant information associated with the occupant 122 to determine an emergency state associated with the first vehicle 106 and/or the occupant 122. Based on the determined emergency state by the neural network model 212, the electronic apparatus 102 may initiate an activation of the emergency request to enable the emergency mode. For example, based on the one or more images, audio samples (i.e. audio for shouting or screaming), the biometric information (such as the heart rate), or the emotional information (such as fear, sad, scared, afraid, or nervous) provided as the occupant information to the neural network model 212, the neural network model 212 may further determine or output the emergency state related to the occupant 122, to indicate to the electronic apparatus 102, that certain emergency situation has been occurred. Similarly, the telematics information (i.e. vehicle data such as, but not limited to, acceleration data, braking data, speed data, temperature data) or the vehicle structure information (i.e. physical condition) of the first vehicle 106 provided, as the vehicle information, to the neural network model 212, the neural network model 212 may further determine or output the emergency state related to the first vehicle 106, to indicate to the electronic apparatus 102, that certain emergency situation has been occurred. The electronic apparatus 102 may be further configured to receive the first input (i.e. corresponding to the selection of the displayed first user-selectable element 104A) from the neural network model 212 based on the automatic determination of the emergency state of the first vehicle 106 or the occupant 122, rather than received manually from the occupant 122.

In order to activate the emergency request (e.g., in case of the medical emergency or accidents), the human machine interface 104 associated with the first vehicle 106 may display the first user-selectable element 104A to the occupant 122. The first user-selectable element 104A may be configured to enable the emergency mode of the first vehicle 106. The electronic apparatus 102 may receive the first input, which may correspond to the first selection of the displayed first user-selectable element 104A. The first input provided by the occupant 122 may be, but not limited to, touch-input based or audio-input based. The first selection may indicate the emergency request to enable the emergency mode for the first vehicle 106. In an embodiment, upon reception of the first input as the first selection of the first user-selectable element 104A either from the occupant 122 or from the neural network model 212, the human machine interface 104 may display an indication that the first user-selectable element 104A is selected based on a graphic (such as, an illumination or highlighting of the first user-selectable element 104A).

In certain embodiments, the electronic apparatus 102 may be configured to capture an audio input (or at least one audio sample) of the occupant 122 through an audio capture device (e.g., the audio capturing device 304) associated with the first vehicle 106. Based on an analysis of the audio input of the occupant 122, the electronic apparatus 102 may select the first user-selectable element 104A on the human machine interface 104 and perform an operation associated with the selected first user-selectable element 104A. Examples of techniques that may be used for the analysis of the audio input may include, but are not limited to, a speech recognition technique, a speech-to-text conversion technique, a natural language processing technique, a neural network or artificial intelligence technique, and/or a machine learning technique. For example, the electronic apparatus 102 may control the audio capturing device 304 to capture the at least one audio sample of the occupant 122 and apply the neural network model 212 on the captured audio sample (such as related to shouting, screaming, or saying predefined words like "Help") of the occupant 122 to further determine the occupant information and the emergency state of the first vehicle 106 and/or the occupant 122.

Figure 4B:
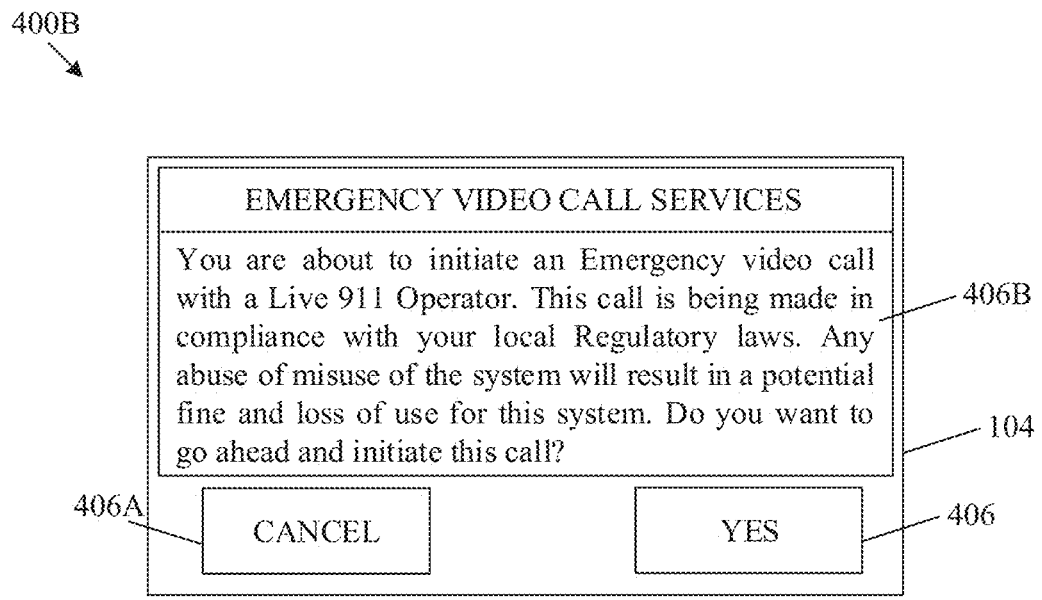
FIGS. 4B-4C are diagrams that collectively illustrate an exemplary human machine interface (HMI) of the electronic apparatus of FIG. 1, which displays a first option to confirm the emergency request, in accordance with an embodiment of the disclosure.
Figure 4C:
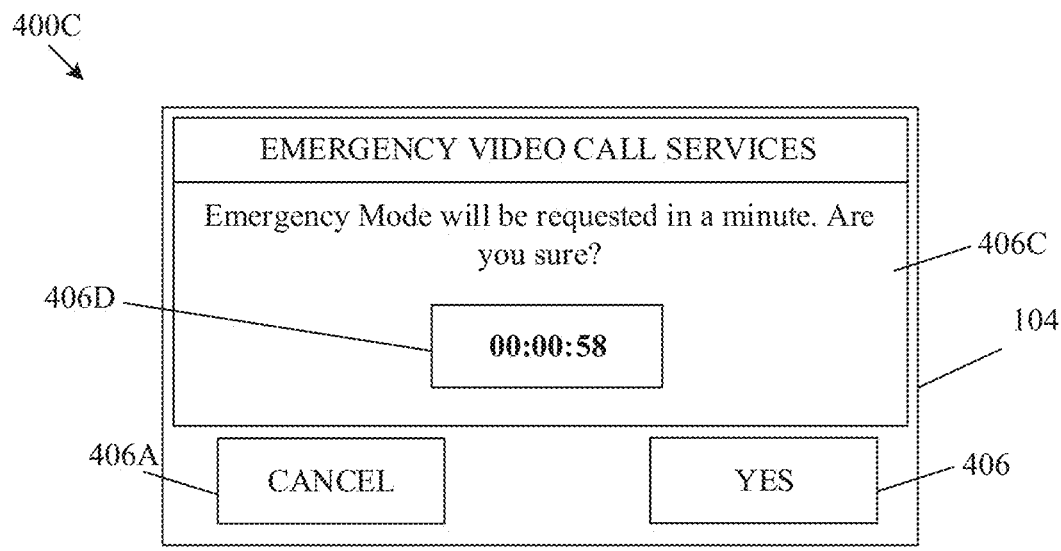

FIGS. 4B-4C are diagrams that collectively illustrate an exemplary human machine interface (HMI) of the electronic apparatus of FIG. 1, which displays a first option to confirm the emergency request, in accordance with an embodiment of the disclosure. FIGS. 4B-4C are explained in conjunction with elements from FIG. 1, FIG. 2, FIG. 3, and FIG. 4A. With reference to FIG. 4B, there is shown an exemplary second scenario 400B to display a first option in the human machine interface 104 to confirm the emergency request.

There is shown in the second scenario 400B, the human machine interface 104 of the electronic apparatus 102. In an embodiment, the electronic apparatus 102 may control, based on the received first input, the human machine interface 104 to display a first option 406 (as shown in the second scenario 400B) to confirm the emergency request to enable the emergency mode for the first vehicle 106. The electronic apparatus 102 may receive a second input, which may correspond to a second selection of the displayed first option 406 for the confirmation of the emergency request. The human machine interface 104 may receive the second input from the occupant 122 (i.e. driver or passenger) for the confirmation of the emergency request. In an embodiment, the human machine interface 104 may also include a first terminate option 406A (as shown in the second scenario 400B), and alert information 406B. The first terminate option 406A may be configured to terminate the emergency request to enable the emergency mode. For example, in case of a false-positive activation (such as an inadvertent activation of the first user-selectable element 104A), a user input may be received from the occupant 122, through the first terminate option 406A, to cancel the emergency request. The alert information 406B may include information associated with legal implications and requirements associated with enablement of the emergency mode. The alert information 406B may be provided to the occupant 122 as a warning notification about the emergency mode. Thus, in case of the false-positive activation, the occupant 122 may cancel such emergency request to avoid a fine or a penalty from the emergency device 108 for the false-positive activation. In an embodiment, the electronic apparatus 102 may control the human machine interface 104 to highlight the first option 406 and/or the first terminate option 406A to alert the occupant 122 to have a second thought to activate the emergency mode in case of real emergency situation.

The scope of the disclosure should not be limited to the display of the alert information 406B on the human machine interface 104. In some embodiments, an audio associated with the alert information 406B may be played back in the first vehicle 106, in lieu of or in addition to the display of the alert information 406B to notify the occupant 122. Further, in certain embodiments, the electronic apparatus 102 may be configured to capture the audio input of the occupant 122 through the audio capture device (e.g., the audio capturing device 304) associated with the first vehicle 106 to receive user input for the selection of the first option 406 or the first terminate option 406A. Based on an analysis of the audio input of the occupant 122, the electronic apparatus 102 may select one of the first option 406 or the first terminate option 406A on the human machine interface 104 and perform an operation associated with the selected option.

With reference to FIG. 4C, there is shown an exemplary third scenario 400C to display the first option on the human machine interface 104 to confirm the emergency request. In an embodiment, similar to FIG. 4B, the human machine interface 104, shown in FIG. 4C, may also display the first option 406 to confirm the emergency request to enable the emergency mode and the first terminate option 406A to cancel the emergency request. The electronic apparatus 102 may activate the timer 210, associated with the electronic apparatus 102, for the pre-determined time period based on the received second input from the occupant 122 for the confirmation. For example, the human machine interface 104 may display an elapsed time 406D of the timer 210 (for example set with the pre-determined time period of one minute). The electronic apparatus 102 may further establish the first communication with the emergency device 108 based on the expiration of elapsed time 406D of the timer 210 (e.g., after completion of one minute from the activation of the timer 210). The timer 210 may facilitate a delay (e.g., the pre-determined time period, such as, one minute) in transmission of the emergency request to the emergency device 108, so that, in case of the false-positive activation, the occupant 122 may have an opportunity to cancel (through the first terminate option 406A) such emergency request during the pre-determined time period, to further avoid the fine or the penalty for the false-positive activation. In an embodiment, based on the received second input, the electronic apparatus 102 may control the human machine interface 104 to display secondary confirmation information 406C, as shown in FIG. 4C.

The secondary confirmation information 406C may include information associated with re-confirmation for the emergency request to enable the emergency mode. For example, the secondary confirmation information 406C may include a message such as, "Emergency Mode will be requested in a minute. Are you sure?". One skilled in the art may understand that the secondary confirmation information 406C shown in FIG. 4C is merely an example, and any other confirmation information may be displayed to confirm with the occupant 122. Examples of the other confirmation information may include a text, a graphic, or a combination of both. Thus, in case of the false positive activation, the secondary confirmation information 406C and the elapsed time 406D of the timer 210 may provide a visual indication to the occupant 122 and an opportunity to cancel such emergency request during the pre-determined time period, to further avoid the fine or the penalty for the false-positive activation. The scope of the disclosure should not be limited to the display of the secondary confirmation information 406C on the human machine interface 104. In some embodiments, an audio associated with the secondary confirmation information 406C may be played back in the first vehicle 106, in lieu of or in addition to the display of the secondary confirmation information 406C to notify the occupant 122.

Figure 4D:
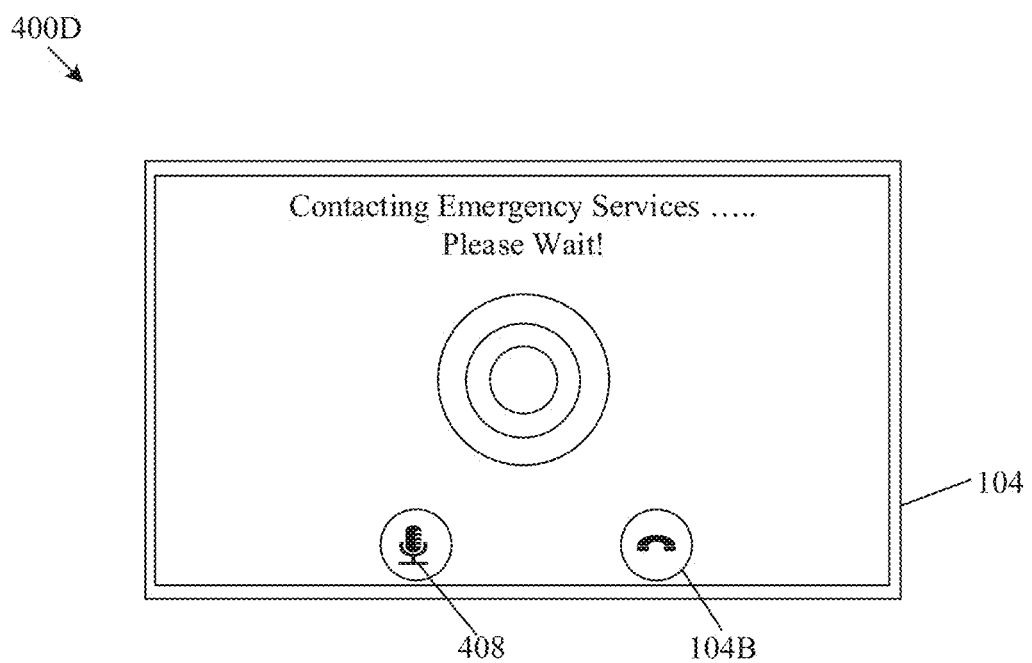
FIGS. 4D-4E are diagrams that collectively illustrate an exemplary human machine interface (HMI) of the electronic apparatus of FIG. 1, which displays a second option to cancel the emergency request, in accordance with an embodiment of the disclosure.
Figure 4E:
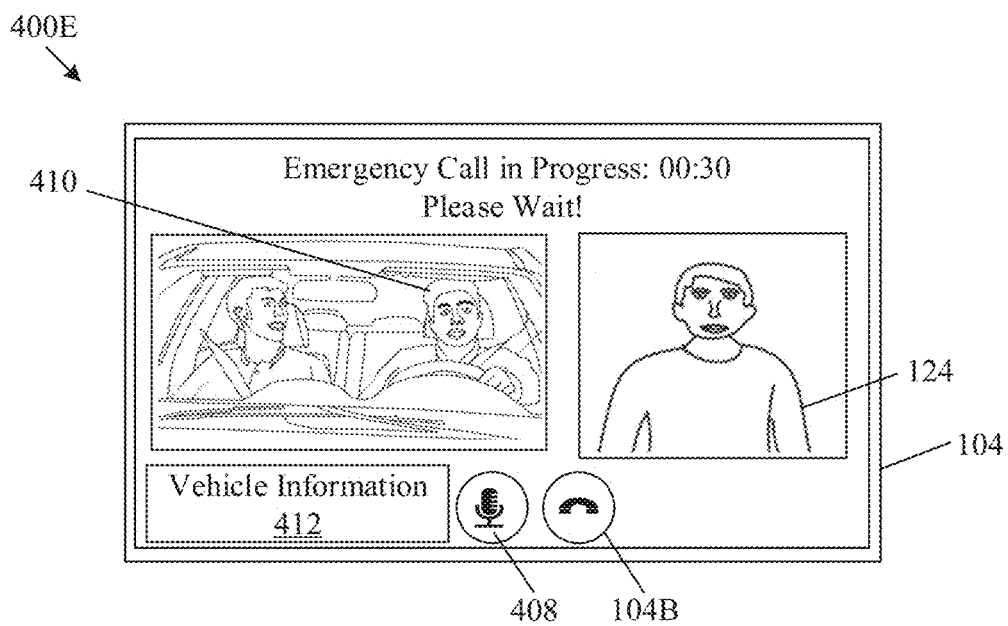

FIGS. 4D-4E are diagrams that collectively illustrate an exemplary human machine interface (HMI) of the electronic apparatus of FIG. 1, which displays a second option to cancel the emergency request, in accordance with an embodiment of the disclosure. FIGS. 4D-4E are explained in conjunction with elements from FIG. 1, FIG. 2, FIG. 3, and FIGS. 4A-4C. With reference to FIG. 4D, there is shown an exemplary fourth scenario 400D to display a second option in the human machine interface 104 to cancel an emergency request.

There is shown in the fourth scenario 400D, the human machine interface 104 of the electronic apparatus 102. In an embodiment, the electronic apparatus 102 may control the human machine interface 104 to display a second option based on the established first communication with the emergency device 108. The electronic apparatus 102 may further receive a third input, which may correspond to a third selection of the displayed second option. The electronic apparatus 102 may terminate the established first communication with the emergency device 108 to cancel the emergency request, based on the received third input. In an embodiment, the second option may be the second user-selectable element 104B that may be configured to cancel the emergency request to enable the emergency mode. In another embodiment, in addition to the second option, the human machine interface 104 may also include a second terminate option 408, as shown in FIG. 4D. The second terminate option 408 may be configured to terminate at least one: an audio connection or a video connection of the established first communication with the emergency device 108. Thus, the second terminate option 408 may facilitate a privacy for the occupant 122 on the established first communication. Thus, even after the establishment of the first communication with the emergency device 108, the second user-selectable element 104B and the second terminate option 408 may be provided to the occupant 122 for the termination of the emergency request and to enhance privacy for the occupant 122, respectively. Thus, in case of the false-positive activation, the occupant 122 may terminate the established first connection to avoid the fine or the penalty for the false-positive activation.

With reference to FIG. 4E, there is shown an exemplary fifth scenario 400E to display the second option in the human machine interface 104 to cancel the emergency request. There is shown in the fifth scenario 400E, the human machine interface 104 of the electronic apparatus 102. In an embodiment, upon establishment of the first communication, the electronic apparatus 102 may control the human machine interface 104 to display (as shown in the fifth scenario 400E) occupant information 410 of the occupant 122, vehicle information 412 of the first vehicle 106, and a video or image of the operator 124 of the emergency device 108. The human machine interface 104 may also display (as shown in the fifth scenario 400E) the second user-selectable element 104B to enable the occupant 122 to cancel the emergency request and the second terminate option 408 to terminate at least one: an the audio connection or the video connection of the established first communication with the emergency device 108. The emergency device 108 may enable the operator 124 to visually inspect the emergency state of at least one of the occupant 122 or the first vehicle 106, based on at least one of the occupant information 410 of the occupant 122 or the vehicle information 412 of the first vehicle 106, which may be received by the emergency device 108 from the electronic apparatus 102. In an embodiment, the occupant information 410 may include at least one of the one or more images of the occupant 122, the biometric information, the emotional information, or the audio information of the occupant 122. In an embodiment, the vehicle information 412 may include at least one of the identification information (such as Vehicle Identification Number (VIN)), the geo-location information (such as the current geo-location of the first vehicle 106), the telematics information associated with the first vehicle 106, or the vehicle structural information (such as, any physical damage on the first vehicle 106). In some embodiments, the electronic apparatus 102 and the emergency device 108 may allow the occupant 122 and the operator 124 to perform an audio or a video communication with each other for the inspection of the emergency state based on the established first communication. Even during the visual inspection of the emergency state by the operator 124, the electronic apparatus 102 may allow the occupant 122 to cancel the request for the emergency mode, via the second user-selectable element 104B. Thus, in case of the false-positive activation of the emergency request, the occupant 122 may still terminate the established first connection to avoid the fine or the penalty for the false-positive activation, during the inspection stage performed by the operator 124 of the emergency device 108. The occupant 122 may also have an option to disable an audio or video associated with the established first communication, via the second terminate option 408, which may ensure privacy of the occupant 122.

In an embodiment, the electronic apparatus 102 may transmit, at least one of: the occupant information 410 of the occupant 122 or the vehicle information 412 of the first vehicle 106, to the emergency device 108 based on the established first communication with the emergency device 108. The electronic apparatus 102 may further receive the emergency confirmation information from the emergency device 108 based on the transmitted at least one of the occupant information 410 of the occupant 122 or the vehicle information 412 of the first vehicle 106. For example, the emergency device 108 may generate the emergency confirmation information based on the visual inspection of at one of the occupant information 410 or the vehicle information 412, performed by the operator 124. The emergency confirmation information may indicate an approval of the emergency request provided by the operator 124. The electronic apparatus 102 may be further configured to receive the emergency confirmation information from the emergency device 108 to actually start the emergency mode for the first vehicle 106. The electronic apparatus 102 may further deactivate the second user-selectable element 104B on the human machine interface (HMI) 104 based on the received emergency confirmation information from the emergency device 108. The second user-selectable element 104B may be deactivated to prevent the occupant 122 from providing an input to cancel the emergency request, once the emergency request may be approved by the operator 124, as indicated in the emergency confirmation information. The electronic apparatus 102 may further receive the one or more control instructions for the first vehicle 106 from the emergency device 108 based on the received emergency confirmation information. Details of the deactivation of the second user-selectable element 104B and the control instructions are provided, for example, in FIG. 4F.

Figure 4F:
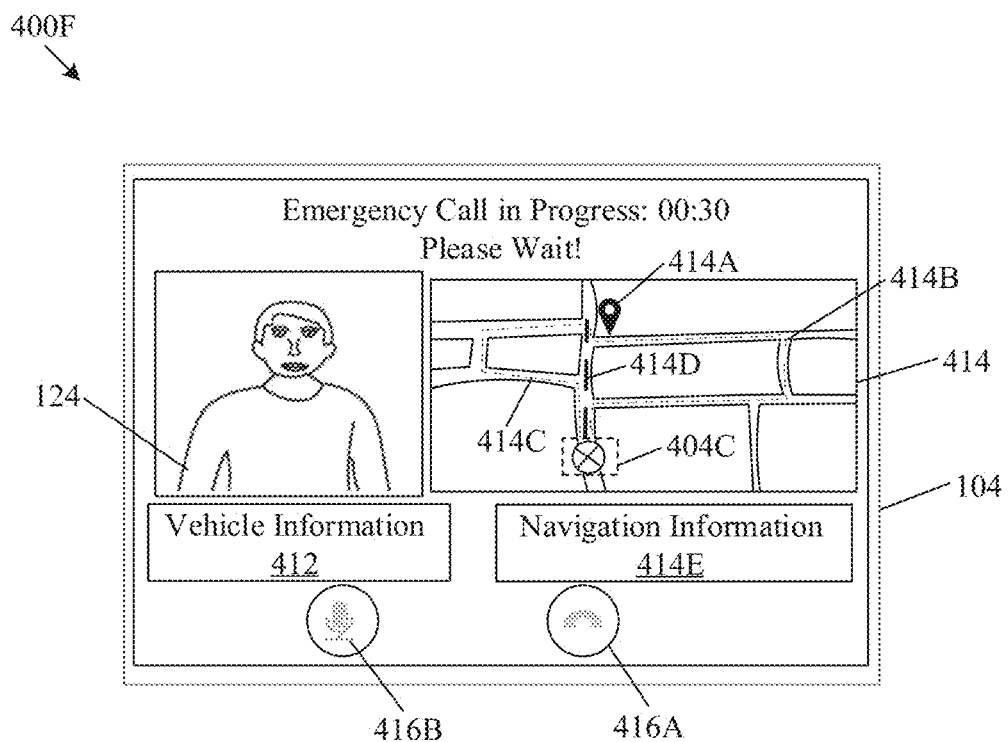
FIG. 4F is a diagram that illustrates an exemplary human machine interface (HMI) of the electronic apparatus of FIG. 1, which displays an enabled emergency mode associated with the first vehicle of FIG. 1, in accordance with an embodiment of the disclosure.

FIG. 4F is a diagram that illustrates an exemplary human machine interface (HMI) of the electronic apparatus of FIG. 1, which displays an enabled emergency mode associated with the first vehicle of FIG. 1, in accordance with an embodiment of the disclosure. FIG. 4F is explained in conjunction with elements from FIG. 1, FIG. 2, FIG. 3, FIGS. 4A-4E. With reference to FIG. 4F, there is shown an exemplary sixth scenario 400F to display an enabled emergency mode in the human machine interface 104 of the electronic apparatus 102 associated with the first vehicle 106.

There is shown in the sixth scenario 400F, the human machine interface 104 of the electronic apparatus 102 in which the emergency mode is activated for the first vehicle 106 or for the occupant 122. In an embodiment, based on the established first communication, the electronic apparatus 102 may receive the one or more control instructions that may include at least one of route information, medical assistance information, or traffic information from the emergency device 108. The electronic apparatus 102 may control the human machine interface 104 (as shown in the sixth scenario 400F) to display the at least one of the route information, the medical assistance information, or the traffic information. The human machine interface 104 may also display (as shown in the sixth scenario 400F) the image or video of the operator 124 and the vehicle information 412. Further, the human machine interface 104 may display (as shown in the sixth scenario 400F) a first icon 416A associated with the second user-selectable element 104B and a second icon 416B associated with the second terminate option 408. Each of the first icon 416A and the second icon 416B may indicate a deactivated state of the second user-selectable element 104B and the second terminate option 408, respectively. In an embodiment, based on the established first communication and the received emergency confirmation information from the emergency device 108 (as described, for example, in FIG. 4E), the electronic apparatus 102 may deactivate the second user-selectable element 104B (i.e. shown in FIG. 4F), such that the occupant 122 may not cancel the emergency mode (or mute/disable the first communication using the second terminate option 408), as the emergency mode of the first vehicle 106 is enabled based on the receipt of the emergency confirmation information.

In the emergency mode, the human machine interface 104 may display second navigation information 414 included in the route information, to further direct the occupant 122 (and/or the first vehicle 106) to reach an emergency assistance point 414A. For example, in case an incident or emergency happens with at least one of the first vehicle 106 or the occupant 122 at an incident point 404C, the second navigation information 414 may guide the occupant 122 (and/or the first vehicle 106) to reach the emergency assistance point 414A from the incident point 404C. The second navigation information 414 may be received, as the control instructions, from the emergency device 108. The second navigation information 414 may enable the occupant 122 to timely reach the emergency assistance point 414A and seek help to redress the incident. Further, during the emergency mode, the real-time image or the video of the operator 124 may be displayed on the human machine interface 104 to indicate that the operator 124 of the emergency device 108 is available through-out the emergency mode to provide any real-time assistance to the occupant 122 of the first vehicle 106, for example at least before reaching the emergency assistance point 414A. In accordance with an embodiment, the human machine interface 104 may display a time duration of the emergency mode or a time duration (such as "00:30" shown in FIG. 4F) of the first communication with the emergency device 108.

In an embodiment, the electronic apparatus 102 may receive speed information as the one or more control instructions from the emergency device 108 based on the established first communication. The electronic apparatus 102 may further receive a current speed of the first vehicle 106 in the travel route from the speed sensing device 308 associated with the first vehicle 106. The electronic apparatus 102 may further control the first vehicle 106 to update the current speed of the first vehicle 106 in the travel route based on the speed information received from the emergency device 108. In case the first vehicle 106 is an autonomous vehicle, the speed of the first vehicle 106 may be controlled based on the received speed information to comply with the instructions from the emergency device 108. In a scenario where the first vehicle 106 is a non-autonomous or semi-autonomous vehicle, the speed information may direct the occupant 122 to drive the first vehicle 106 based on a speed prescribed by the emergency device 108, thereby reducing a burden of decision making associated with control of speed and driving the first vehicle 106 from the occupant 122. This may enable the occupant 122 to take precautionary measures during the emergency mode by driving the first vehicle 106 at regulated speed indicated by the received speed information.

In another embodiment, during the emergency mode, the electronic apparatus 102 may receive the traffic information (i.e. which indicate vehicle traffic in a travel route to reach the emergency assistance point 414A from the traffic server 110. Based on the emergency state of the occupant 122 and the traffic information received from the traffic server 110, the electronic apparatus 102 may select a travel route from multiple routes (such as a first alternate route 414B, a second alternate route 414C, and a third alternate route 414D, as shown in FIG. 4F) to reach the emergency assistance point 414A or any other destination point. The electronic apparatus 102 may determine a time period to reach the emergency assistance point 414A from each of the first alternate route 414B, the second alternate route 414C, and the third alternate route 414D to select the travel route. The electronic apparatus 102 may select the travel route that may have a minimal time period to reach the emergency assistance point 414A from the incident point 404C, based on the comparison between the time periods to reach the emergency assistance point 414A through the first alternate route 414B, the second alternate route 414C, and the third alternate route 414D. In an embodiment, the electronic apparatus 102 may further provide navigation information 414E to reach the emergency assistance point 414A through the travel route that may have the minimal time period. The navigation information 414E may guide the occupant 122 (and/or the first vehicle 106 itself, in case of an autonomous vehicle) to reach the emergency assistance point 414A quickly through a fastest and/or safest route considering the incident or emergency associated with the first vehicle 106 and/or the occupant 122. The navigation information 414E may include, but not limited to, information about turns, speed breakers, potholes, slippery roads, or obstacles or barriers on the road.

In an embodiment, the one or more control instructions received from the emergency device 108 may include the medical assistance information for the occupant 122. The medical assistance information may include first aid information for the occupant 122 to handle the emergency situation. In an embodiment, the emergency assistance point 414A may be include the medical diagnostic center 112, which may also provide the medical assistance information to the occupant 122.

In an embodiment, during the emergency mode, the electronic apparatus 102 may receive information about the medical diagnostic center 112 from the emergency device 108 as the one or more control instructions. The electronic apparatus 102 may then establish a second communication with the diagnostic device 112A associated with the medical diagnostic center 112 based on the received information about the medical diagnostic center 112. The received information about the medical diagnostic center 112 may include contact details, such as, but not limited to, a phone number, an email address, IP address, or a uniform resource locator (URL). In an embodiment, the received information about the medical diagnostic center 112 may include a second geo-location of the medical diagnostic center 112. The electronic apparatus 102 may transmit health status information (such as a type of medical emergency, for example, a dizziness, a seizure, high blood loss, stress, low pulse-rate, wounds on body, breathing issue, and the like) about the occupant 122 of the first vehicle 106 to the diagnostic device 112A based on the established second communication. The electronic apparatus 102 may receive the medical assistance information from the diagnostic device 112A based on the transmitted health status information. Upon receipt of the medical assistance information, the electronic apparatus 102 may control the human machine interface 104 to display the received medical assistance information for the occupant 122.

The medical assistance information, such as, the first aid information may be useful for the occupant 122 to perform first aid for a medical emergency of a co-passenger, driver, or self. Timely receipt and use of the first aid information may be critical to save lives. Further, as the medical assistance information may be provided by the emergency device 108 and/or the medical diagnostic center 112, the medical assistance information may be authentic and relevant for the current medical emergency, based on the health status information.

In another embodiment, the electronic apparatus 102 may transmit medical condition information (such as a severity of the medical emergency, for example, a heart attack) about the occupant 122 of the first vehicle 106 to the emergency device 108 based on the established first communication. The electronic apparatus 102 may then receive the information about the medical diagnostic center 112 from the emergency device 108 based on the transmitted medical condition information. For example, in case the severity is high, before the first vehicle 106 reaches the emergency assistance point 414A, the emergency device 108 may provide information associated with a rendezvous medical diagnostic center (not shown) at a checkpoint between the incident point 404C and the emergency assistance point 414A. The rendezvous medical diagnostic center may provide the first aid information and/or medical assistance (such as, a Cardio-Pulmonary Resuscitation (CPR)) to control the severity of the medical emergency before the first vehicle 106 reaches the emergency assistance point 414A. Thus, the rendezvous medical diagnostic center (such as, a mobile ambulance or a mobile clinic) may be critical to save lives of one or more passengers (e.g., the occupant 122) of the first vehicle 106. The electronic apparatus 102 may be configured to control the human machine interface 104 to display the information associated with the rendezvous medical diagnostic center. In some embodiments, the electronic apparatus 102 may display the second navigation information 414 on the human machine interface 104 to reach the rendezvous medical diagnostic center.

In another embodiment, the electronic apparatus 102 may detect a first geo-location of the first vehicle 106 based on the location sensing device 306 associated with the first vehicle 106. The electronic apparatus 102 may then extract the second geo-location of the medical diagnostic center 112 from the received information about the medical diagnostic center 112. The electronic apparatus 102 may be further configured to update the emergency mode to a regular mode of the first vehicle 106 based on the detected first geo-location and the extracted second geo-location. For example, in case the first vehicle 106 reaches the emergency assistance point 414A (i.e., the medical diagnostic center 112), the electronic apparatus 102 may reset the emergency mode to the regular mode of the first vehicle 106 for emergency purposes in future. Based on the reset of the emergency mode to the regular mode, the electronic apparatus 102 may terminate the established first communication with the emergency device 108.

Figure 5A:
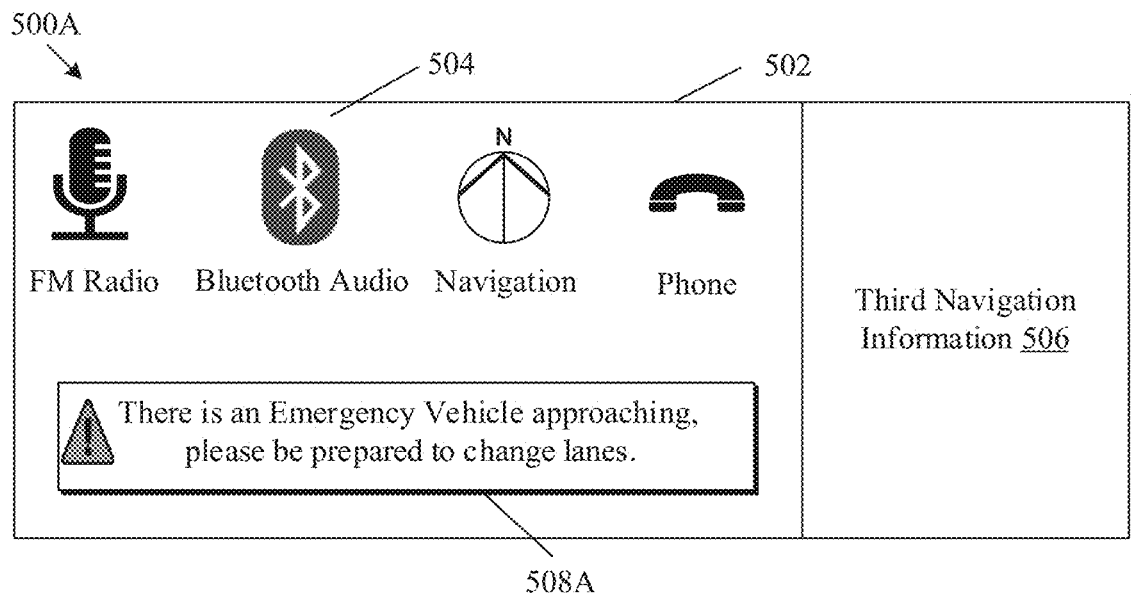
FIGS. 5A-5B are diagrams that collectively illustrate an exemplary human machine interface (HMI) to provide an emergency notification to a plurality of vehicles based on instructions from the electronic apparatus of FIG. 1, in accordance with an embodiment of the disclosure.
Figure 5B:
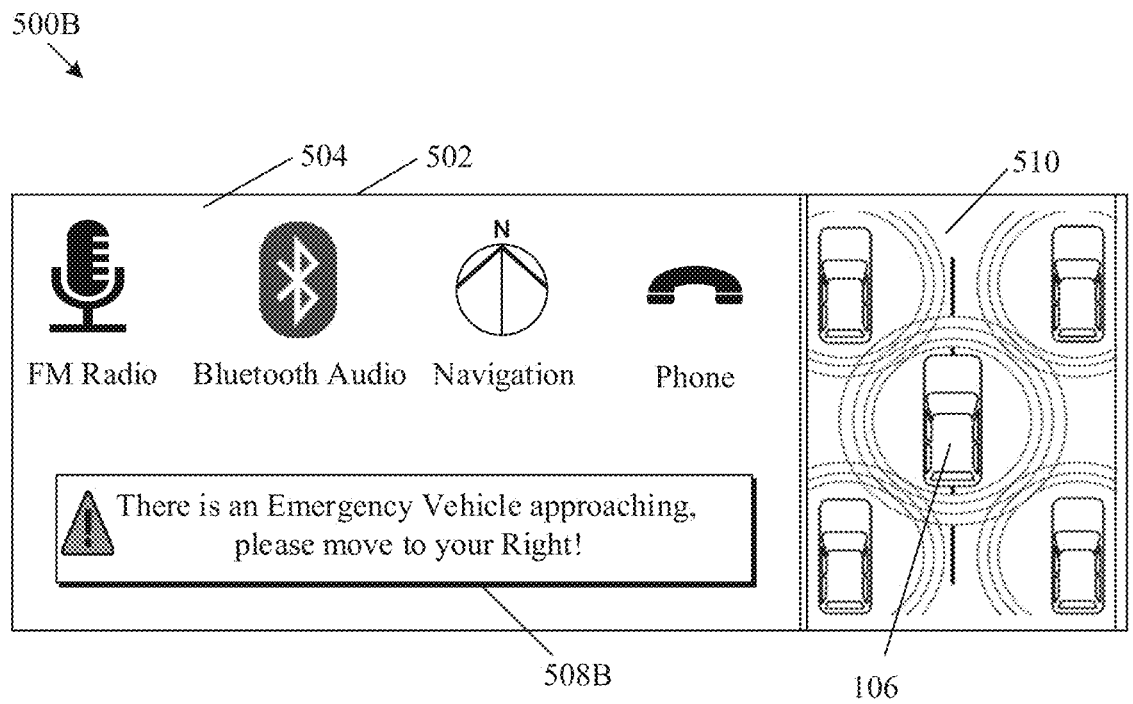

FIGS. 5A-5B are diagrams that collectively illustrate an exemplary human machine interface (HMI) to provide an emergency notification to a plurality of vehicles based on instructions from the electronic apparatus of FIG. 1, in accordance with an embodiment of the disclosure. FIGS. 5A-5B are explained in conjunction with elements from FIG. 1, FIG. 2, FIG. 3, FIGS. 4A-4F. With reference to FIG. 5A, there is shown an exemplary first scenario 500A for a human machine interface 502 associated with one of the plurality of second vehicles 116, which may display an emergency notification based on instructions received from the electronic apparatus 102. The plurality of second vehicles 116 may be travelling or located on the travel route of the first vehicle 106 to the medical diagnostic center 112.

There is shown in the first scenario 500A, the human machine interface 502 including a plurality of user-selectable elements 504 and third navigation information 506 associated with the plurality of second vehicles 116. The plurality of user-selectable elements 504 may include, but not limited to, a FM radio element, a Bluetooth® audio element, a navigation element, or a phone element. The third navigation information 506 may include information that may be used to navigate a vehicle (i.e. corresponding vehicle of the plurality of second vehicles 116) from a source location to a destination location. Description of the plurality of user-selectable elements 504 and the third navigation information 506 has been omitted from the disclosure for the sake of brevity.

In an embodiment, an electronic apparatus of each of the plurality of second vehicles 116 (i.e. similar to the electronic apparatus 102 of the first vehicle 106) may control the human machine interface 502 to display (as shown in the first scenario 500A) a first emergency notification 508A based on a first proximity of the plurality of second vehicles 116 with the first vehicle 106. For example, the first proximity may indicate a first distance (such as, 30-50 meters) between the first vehicle 106 and the one of the plurality of second vehicles 116. The first proximity between the first vehicle 106 and the plurality of second vehicles 116 may be detected based on the geo-locations detected by the location sensing device 306 of the first vehicle 106 and similar location sensing device for each of the plurality of second vehicles 116. In another embodiment, the electronic apparatus 102 may determine the first proximity using the proximity sensing device 310. Based on the first proximity, the human machine interface 502 may display the first emergency notification 508A that may include information related to the approaching first vehicle 106 with an enabled emergency mode. For example, the first emergency notification 508A may include a notification such as, "There is an Emergency Vehicle approaching, please be prepared to change lanes." In an embodiment, the first emergency notification 508A may be provided by the electronic apparatus 102 of the first vehicle 106 to the plurality of second vehicles 116, via a vehicle-to-vehicle (V2V) communication. In some embodiments, the first emergency notification 508A may be provided from the traffic server 110 to the plurality of second vehicles 116. One skilled in the art may understand that first emergency notification 508A shown in FIG. 5A is merely an example, and any other notification information may be displayed on the human machine interface 502. Examples of the other notification information may include a text, a graphic, or a combination of both.

With reference to FIG. 5B, there is shown an exemplary second scenario 500B for the human machine interface 502 associated with one of the plurality of second vehicles 116, which may display an emergency notification based on instructions received from the electronic apparatus 102. There is shown in the second scenario 500B, the human machine interface 502 including the plurality of user-selectable elements 504. In an embodiment, the electronic apparatus of the plurality of second vehicles 116 may control the human machine interface 502 to display (as shown in the second scenario 500B) a second emergency notification 508B based on a second proximity of the plurality of second vehicles 116 with the first vehicle 106. For example, the second proximity may indicate a second distance between the first vehicle 106 and the one of the plurality of second vehicles 116. The second distance indicated by the second proximity may be lesser than the first distance indicated by the first proximity (i.e. described, for example, in FIG. 5A). For example, the second distance may be a distance lesser than 30 meters. Based on the second proximity, the human machine interface 502 may display the second emergency notification 508B that may include information related to the approaching first vehicle 106 with the enabled emergency mode. For example, the first emergency notification 508A may include a notification, such as, "There is an Emergency Vehicle approaching, please move to your Right!" One skilled in the art may understand that second emergency notification 508B shown in FIG. 5B is merely an example, and any other notification information may be displayed to human machine interface 502. Examples of the other notification information may include a text, a graphic, or a combination of both. In yet another embodiment, the electronic apparatus of the plurality of second vehicles 116 may also control the human machine interface 502 to display an emergency graphic 510 that may visually depict the approaching first vehicle 106.

In certain embodiments, the electronic apparatus associated with each of the plurality of second vehicles 116 may receive traffic clearance instructions from the control device 118A of the law enforcement authority 118. Based on the received traffic clearance instructions, the electronic apparatus of each of the plurality of second vehicles 116 may be configured to control the human machine interface 502 of the plurality of second vehicles 116 to display one or more of the first emergency notification 508A, the second emergency notification 508B, or the emergency graphic 510.

The display of notifications on the human machine interface 502 of each of the plurality of second vehicles 116 may direct the driver of the respective vehicle (or the vehicle itself, in case of an autonomous or a semi-autonomous vehicle) to be aware about an approaching vehicle (e.g., the first vehicle 106) with the enabled emergency mode. The notifications may also direct the driver of the respective vehicle (or the vehicle itself, in case of an autonomous or a semi-autonomous vehicle) to change lanes, regulate speed, or perform other maneuvers to allow the approaching vehicle (e.g., the first vehicle 106) to pass. This may enable the first vehicle 106 to safely drive and reach a destination location (e.g., the medical diagnostic center 112) quickly to seek help (e.g., medical assistance).

Figure 6:
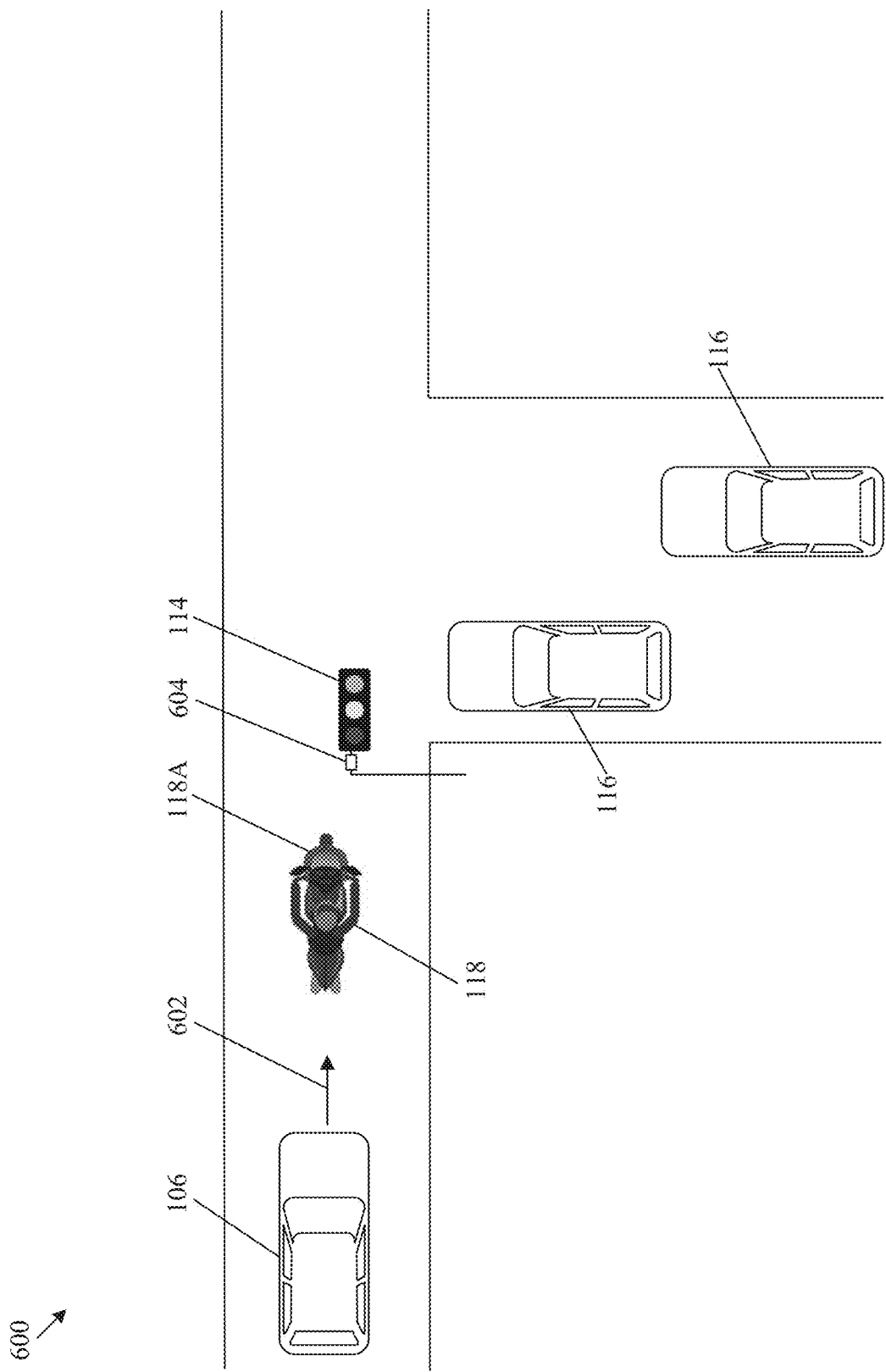
FIG. 6 is a diagram that illustrates an exemplary scenario to control traffic, based on instructions from the electronic apparatus of FIG. 1, in accordance with an embodiment of the disclosure.

FIG. 6 is a diagram that illustrates an exemplary scenario to control traffic, based on instructions from the electronic apparatus of FIG. 1, in accordance with an embodiment of the disclosure. FIG. 6 is explained in conjunction with elements from FIG. 1, FIG. 2, FIG. 3, FIGS. 4A-4F, and FIGS. 5A-5B. With reference to FIG. 6, there is shown an exemplary scenario 600 to control traffic, based on instructions from the electronic apparatus 102.

There is shown in the scenario 600, the first vehicle 106 that may travel on a travel route 602, the law enforcement authority 118, the control device 118A associated with or integrated in the law enforcement authority 118, one or more traffic light devices 114, a traffic camera 604, and the plurality of second vehicles 116 on a road intersection on the travel route 602. In an embodiment, the electronic apparatus 102 may transmit emergency instructions to the traffic server 110 based on the traffic information included in the one or more control instructions received from the emergency device 108. Based on the transmitted emergency instructions, the electronic apparatus 102 may receive one or more notifications from the traffic server 110. The electronic apparatus 102 may further receive information about the one or more traffic light devices 114 from the traffic server 110. The received information may include contact details of the one or more traffic light devices 114. Based on the received information (such as, the one or more notifications and/or the information about the one or more traffic light devices 114) from the traffic server 110, the electronic apparatus 102 may send one or more instructions to the one or more traffic light devices 114. In some embodiments, the received information from the traffic server 110 may include information (i.e. such as contact details) about the plurality of second vehicles 116 on the travel route 602. Based on the received information (i.e. such as contact details) about the plurality of second vehicles 116, the electronic apparatus 102 may further provide the first emergency notification 508A or the second emergency notification 508B to the plurality of second vehicles 116, as described, for example, in FIGS. 5A-5B.

For example, in order to reach the emergency assistance point 414A (i.e., the medical diagnostic center 112) through the travel route 602 with a minimal time period, the electronic apparatus 102 may control the one or more traffic light devices 114 on the travel route 602, based on the one or more instructions sent from the electronic apparatus 102 of the first vehicle 106 (with enabled emergency mode) to the one or more traffic light devices 114. The control of the one or more traffic light devices 114 may control the movement of the plurality of second vehicles 116 and clear the plurality of second vehicles 116 from the travel route 602 of the first vehicle 106. For example, the electronic apparatus 102 may control the one or more traffic light devices 114 to illuminate a first illumination (such as a "STOP" signal) to stop the movement of the plurality of second vehicles 116 on the travel route 602, for quick movement of the first vehicle 106 during the emergency mode. In another embodiment, the electronic apparatus 102 may control the one or more traffic light devices 114 to illuminate a second illumination (such as a "GO" signal) to allow the movement of one or more of the plurality of second vehicles 116 on the travel route 602 based on the movement of the first vehicle 106 on the travel route 602 towards the medical diagnostic center 112 or the rendezvous medical diagnostic center. For example, when the first vehicle 106 travels past the road intersection on the travel route 602, the electronic apparatus 102 may send the one or more instructions to further control the one or more traffic light devices 114 to illuminate the second illumination (such as the GO signal) to allow the movement of the plurality of second vehicles 116 on the road intersection and/or on the travel route 602.

In another embodiment, the electronic apparatus 102 may transmit at least one of the traffic information of the travel route 602 or the emergency information (such as medical condition) of the occupant 122 of the first vehicle 106 to the law enforcement authority 118. Based on at least one the traffic information or the emergency information, the law enforcement authority 118 may generate traffic clearance instructions. Based on the generated traffic clearance instructions, the control device 118A associated with the law enforcement authority 118 may control the movement of the plurality of second vehicles 116 on the travel route 602 for the quick movement of the first vehicle 106. For example, the control device 118A may transmit the traffic clearance instructions to an electronic apparatus of each of the plurality of second vehicles 116. The electronic apparatus of each of the plurality of second vehicles 116 may display the traffic clearance instructions (i.e. the first emergency notification 508A or the second emergency notification 508B) on the human machine interface 502, as explained, for example, in FIGS. 5A-5B. Thus, the first vehicle 106 may be given priority with respect to the plurality of second vehicles 116 and a faster passage at intersection with traffic lights, which may allow the first vehicle 106 to quickly reach a destination location (e.g., the medical diagnostic center 112) and seek help (e.g. medical assistance). It may be noted that the control of the one or more traffic light devices 114 in FIG. 6 is merely presented as an example. The electronic apparatus 102 may provide instruction to other infrastructure on the travel route 602 to assist the first vehicle 106 to reach the destination location, without a deviation from scope of the disclosure.

In yet another embodiment, the one or more traffic light devices 114 may be coupled with the traffic camera 604, as shown in FIG. 6. The traffic camera 604 may remotely capture at least one image of a part of the first vehicle 106 or the occupant 122 of the first vehicle 106 and transmit the captured image to the electronic apparatus 102. Based on the captured image, the electronic apparatus 102 may determine the at least one of the vehicle information 412 (such as vehicle structure information) of the first vehicle 106 or the occupant information 410 (such as images, emotional information) of the occupant 122. The electronic apparatus 102 may transmit at least one of the vehicle information 412 or the occupant information 410 to the emergency device 108 and may receive the emergency confirmation information from the emergency device 108, based on the transmitted vehicle information 412 and/or the occupant information 410, as described, for example, in FIG. 4E.

Figure 7:
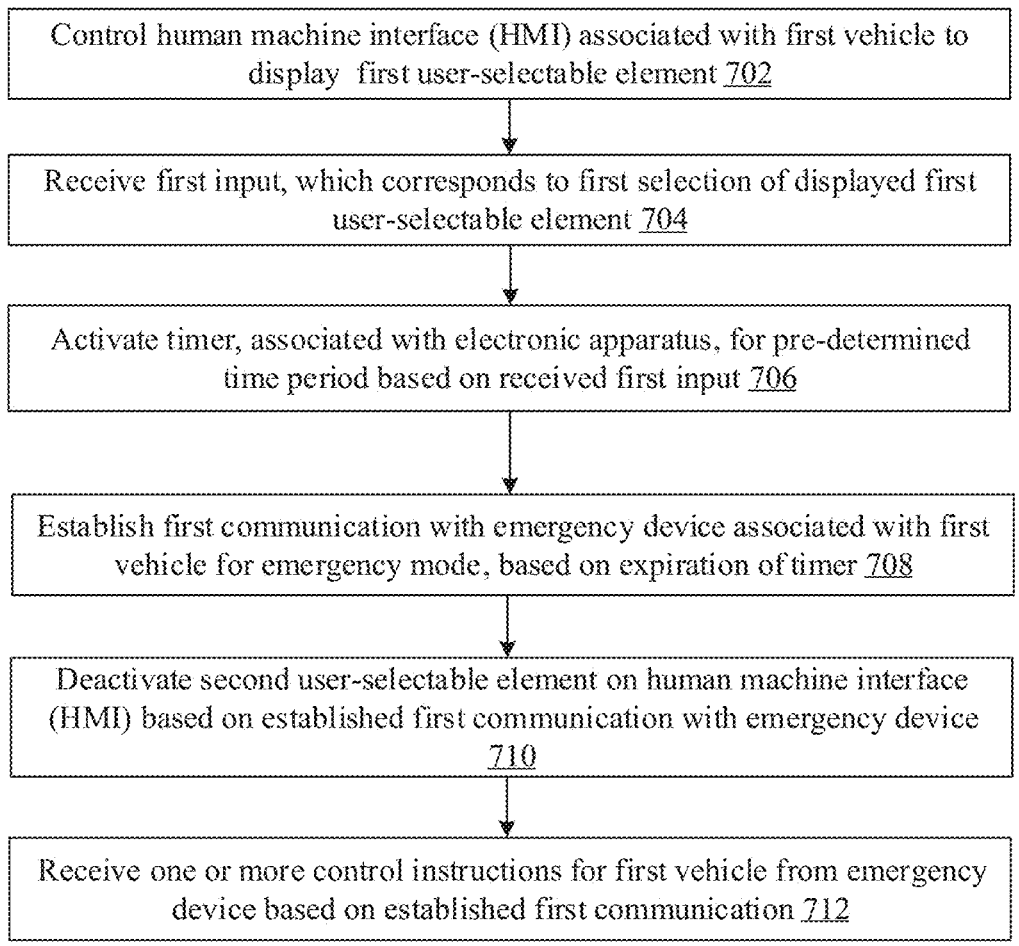
FIG. 7 is a flowchart that illustrates exemplary operations of an electronic apparatus for emergency control for a vehicle, in accordance with an embodiment of the disclosure.

FIG. 7 is a flowchart that illustrates exemplary operations of an electronic apparatus for emergency control for a vehicle, in accordance with an embodiment of the disclosure. FIG. 7 is explained in conjunction with elements from FIG. 1, FIG. 2, FIG. 3, FIGS. 4A-4F, FIGS. 5A-5B, and FIG. 6. With reference to FIG. 7, there is shown a flowchart 700. The operations from 702 to 712 may be implemented, for example, by the electronic apparatus 102, or the circuitry 202 of FIG. 2. The operations of the flowchart 700 may start at 702.

At 702, the human machine interface 104 associated with the first vehicle 106 may be controlled to display the first user-selectable element 104A. In an embodiment, the electronic apparatus 102 or the circuitry 202 may be configured to control the human machine interface 104 to display the first user-selectable element 104A. Details related to the display of the first user-selectable element 104A are explained, for example, in FIG. 4A.

At 704, the first input, which may correspond to the first selection of the displayed first user-selectable element 104A, may be received. In an embodiment, the electronic apparatus 102 or the circuitry 202 may be configured to receive the first input from the occupant 122 or from the neural network model 212. The first input may correspond to the first selection of the displayed first user-selectable element 104A. Details related to the receipt of the first input are explained, for example, in FIG. 4A.

At 706, the timer 210 may be activated for the pre-determined time period based on the received first input. In an embodiment, the electronic apparatus 102 or the circuitry 202 may be configured to activate the timer 210 for the pre-determined time period based on the received first input. Details related to the activation of the timer 210 are explained, for example, in FIG. 4C.

At 708, the first communication may be established with the emergency device 108 associated with first vehicle 106, for the emergency mode, based on the expiration of the timer 210. In an embodiment, the electronic apparatus 102 or the circuitry 202 may be configured to establish the first communication with the emergency device 108 associated with first vehicle 106 for the emergency mode, based on the expiration of the timer 210. Details related to the establishment of the first communication are explained, for example, in FIGS. 4D-4E.

At 710, the second user-selectable element 104B may be deactivated on the human machine interface 104 based on the established first communication with emergency device 108. In an embodiment, the electronic apparatus 102 or the circuitry 202 may be configured to deactivate the second user-selectable element 104B on the human machine interface 104 based on the established first communication with emergency device 108. Details related to the deactivation of the second user-selectable element 104B are explained, for example, in FIG. 4F.

At 712, the one or more control instructions may be received for the first vehicle 106 from the emergency device 108 based on the established first communication. In an embodiment, the electronic apparatus 102 or the circuitry 202 may receive the one or more control instructions for the first vehicle 106 from the emergency device 108 based on the established first communication. Details related to the reception of the one or more control instructions are explained, for example, in FIGS. 4F and 6. Control may pass to end.

The flowchart 700 is illustrated as discrete operations, such as 702, 704, 706, 708, 710, and 712. However, in certain embodiments, such discrete operations may be further divided into additional operations, combined into fewer operations, or eliminated, depending on the particular implementation without detracting from the essence of the disclosed embodiments.

Various embodiments of the disclosure may provide a non-transitory, computer-readable medium and/or storage medium, and/or a non-transitory machine readable medium and/or storage medium stored thereon, a set of instructions executable by a machine and/or a computer (for example the electronic apparatus 102) for emergency control for a vehicle. The set of instructions may be executable by the machine and/or the computer (for example the electronic apparatus 102) to perform operations that may include control of a human machine interface (such as, the human machine interface 104) associated with a first vehicle (such as, the first vehicle 106) to display a first user-selectable element (such as, the first user-selectable element 104A). The operations may further include reception of the first input that may correspond to the first selection of the displayed first user-selectable element 104A. The operations may further include activation of a timer (e.g., the timer 210) that may be associated with the electronic apparatus 102, for the pre-determined time period based on the received first input. The operations may further include establishment of the first communication with an emergency device (e.g., the emergency device 108) associated with the first vehicle 106 for the emergency mode, based on the expiration of the timer 210. The operations may further include deactivation of a second user-selectable element (e.g., the second user-selectable element 104B) on the human machine interface 104 based on the established first communication with the emergency device 108. The operations may further include reception of the one or more control instructions for the first vehicle 106 from the emergency device 108 based on the established first communication.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions. It may be understood that, depending on the embodiment, some of the steps described above may be eliminated, while other additional steps may be added, and the sequence of steps may be changed.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with an information processing capability to perform a particular function either directly, or after either or both of the following: a) conversion to another language, code or notation; b) reproduction in a different material form. While the present disclosure has been described with reference to certain embodiments, it will be understood by those skilled in the art that various changes may be made, and equivalents may be substituted without departing from the scope of the present disclosure. In addition, many modifications may be made to adapt a particular situation or material to the teachings of the present disclosure without departing from its scope. Therefore, it is intended that the present disclosure is not limited to the particular embodiment disclosed, but that the present disclosure will include all embodiments that fall within the scope of the appended claims.

What is claimed is:

1. An electronic apparatus, comprising:
    a memory; and
    circuitry coupled with the memory, wherein the circuitry:
        controls a human machine interface (HMI) associated with a first vehicle to display a first user-selectable element, wherein the first user-selectable element is configured to enable an emergency mode of the first vehicle;
        receives a first input, which corresponds to a first selection of the displayed first user-selectable element, wherein the first selection indicates a request to enable the emergency mode;
        activates a timer, associated with the electronic apparatus, for a pre-determined time period based on the received first input;
        establishes a first communication with an emergency device associated with the first vehicle for the emergency mode, based on an expiration of the timer;
        deactivates a second user-selectable element on the human machine interface (HMI) based on the established first communication with the emergency device, wherein the second user-selectable element is configured to cancel the request; and
        receives one or more control instructions for the first vehicle from the emergency device based on the established first communication.

2. The electronic apparatus according to claim 1, wherein the circuitry further:
    controls, based on the received first input, the human machine interface (HMI) to display a first option to confirm the request to enable the emergency mode;
    receives a second input, which corresponds to a second selection of the displayed first option for the confirmation of the request;
    activates the timer, associated with the electronic apparatus, for the pre-determined time period based on the received second input; and
    establishes the first communication with the emergency device based on the expiration of the timer.

3. The electronic apparatus according to claim 1, wherein the circuitry further:
    controls the human machine interface (HMI) to display a second option based on the established first communication with the emergency device;
    receives a third input, which corresponds to a third selection of the displayed second option; and
    terminates the established first communication with the emergency device to cancel the request based on the received third input.

4. The electronic apparatus according to claim 1, wherein the circuitry further:

transmits, at least one of: vehicle information of the first vehicle or occupant information, to the emergency device based on the established first communication with the emergency device;

receives emergency confirmation information from the emergency device based on the transmitted at least one of: the vehicle information of the first vehicle or the occupant information;

deactivates the second user-selectable element on the human machine interface (HMI) based on the received emergency confirmation information from the emergency device; and receives the one or more control instructions for the first vehicle from the emergency device based on the received emergency confirmation information.

5. The electronic apparatus according to claim 4, wherein the vehicle information of the first vehicle comprises at least one of: identification information, geo-location information, telematics information, or vehicle structural information.

6. The electronic apparatus according to claim 4, wherein the occupant information of an occupant of the first vehicle comprises at least one of: one or more images of the occupant, biometric information, emotional information, or audio information of the occupant.

7. The electronic apparatus according to claim 4, wherein the electronic apparatus is communicably coupled with an image capturing device of the first vehicle, wherein the circuitry further:

controls the image capturing device to capture at least one image of: a part of the first vehicle or an occupant of the first vehicle; and determine the at least one of: the vehicle information of the first vehicle or the occupant information based on the captured at least one image.

8. The electronic apparatus according to claim 4, wherein the electronic apparatus is communicably coupled with an audio capturing device of the first vehicle, wherein the circuitry further:

controls the audio capturing device to capture at least one audio sample of an occupant of the first vehicle; and determine the occupant information based on the captured at least one audio sample of the occupant.

9. The electronic apparatus according to claim 1, wherein the memory stores a neural network model, wherein the circuitry further:

controls the neural network model to determine an emergency state of the first vehicle based on at least one of: vehicle information of the first vehicle or occupant information of an occupant of the first vehicle; and receives the first input, which corresponds to the first selection of the displayed first user-selectable element based on the determined emergency state of the first vehicle.

10. The electronic apparatus according to claim 9, wherein the circuitry further:

transmits information about the emergency state to the emergency device, based on the established first communication with the emergency device;

receives emergency confirmation information from the emergency device based on the transmitted information about the emergency state;

deactivates the second user-selectable element on the human machine interface based on the received emergency confirmation information from the emergency device; and receives the one or more control instructions for the first vehicle from the emergency device based on the received emergency confirmation information.

11. The electronic apparatus according to claim 1, wherein the one or more control instructions comprise at least one of: route information, traffic information, or medical assistance information, and wherein the circuitry further controls the human machine interface (HMI) to display the at least one of: the route information, the traffic information, or the medical assistance information.

12. The electronic apparatus according to claim 11, wherein the circuitry further:

transmits emergency instructions to a traffic server based on the traffic information included in the received one or more control instructions from the emergency device; and receives one or more notifications from the traffic server based on the transmitted emergency instructions.

13. The electronic apparatus according to claim 1, wherein the circuitry further:

receives information about one or more traffic light devices from a traffic server; and sends one or more instructions to the one or more traffic light devices based on the received information from the traffic server.

14. The electronic apparatus according to claim 1, wherein the circuitry further:

receives information about a medical diagnostic center from the emergency device as the one or more control instructions;

establishes a second communication with a diagnostic device associated with the medical diagnostic center based on the received information about the medical diagnostic center;

transmits health status information about an occupant of the first vehicle to the diagnostic device based on the established second communication;

receives medical assistance information from the diagnostic device based on the transmitted health status information; and controls the human machine interface (HMI) to display the received medical assistance information.

15. The electronic apparatus according to claim 14, wherein the circuitry further:

transmits medical condition information about an occupant of the first vehicle to the emergency device based on the established first communication; and receives the information about the medical diagnostic center from the emergency device based on the transmitted medical condition information.

16. The electronic apparatus according to claim 14, wherein the circuitry further:

detects a first geo-location of the first vehicle;

extracts a second geo-location of the medical diagnostic center from the received information about the medical diagnostic center; and updates the emergency mode to a regular mode of the first vehicle based on the detected first geo-location and the extracted second geo-location.

17. The electronic apparatus according to claim 1, wherein the circuitry further:

receives speed information as the one or more control instructions from the emergency device based on the established first communication;

receives a current speed of the first vehicle from a speed sensor associated with the first vehicle; and control the first vehicle to update the current speed of the first vehicle based on the speed information received from the emergency device.

18. A method, comprising:
in an electronic apparatus:
controlling a human machine interface (HMI) associated with a first vehicle to display a first user-selectable element, wherein the first user-selectable element is configured to enable an emergency mode of the first vehicle;
receiving a first input, which corresponds to a first selection of the displayed first user-selectable element, wherein the first selection indicates a request to enable the emergency mode;
activating a timer, associated with the electronic apparatus, for a pre-determined time period based on the received first input;
establishing a first communication with an emergency device associated with the first vehicle for the emergency mode, based on an expiration of the timer;
deactivating a second user-selectable element on the human machine interface (HMI) based on the established first communication with the emergency device, wherein the second user-selectable element is configured to cancel the request; and
receiving one or more control instructions for the first vehicle from the emergency device based on the established first communication.

19. The method according to claim 18, further comprising:
controlling, based on the received first input, the human machine interface (HMI) to display a first option to confirm the request to enable the emergency mode;
receiving a second input, which corresponds to a second selection of the displayed first option for the confirmation of the request;
activating the timer, associated with the electronic apparatus, for the pre-determined time period based on the received second input; and
establishing the first communication with the emergency device based on the expiration of the timer.

20. A non-transitory computer-readable medium having stored thereon, computer-executable instructions which, when executed by an electronic apparatus, cause the electronic apparatus to execute operations, the operations comprising:
controlling a human machine interface (HMI) associated with a first vehicle to display a first user-selectable element, wherein the first user-selectable element is configured to enable an emergency mode of the first vehicle;
receiving a first input, which corresponds to a first selection of the displayed first user-selectable element, wherein the first selection indicates a request to enable the emergency mode;
activating a timer, associated with the electronic apparatus, for a pre-determined time period based on the received first input;
establishing a first communication with an emergency device associated with the first vehicle for the emergency mode, based on an expiration of the timer;
deactivating a second user-selectable element on the human machine interface (HMI) based on the established first communication with the emergency device, wherein the second user-selectable element is configured to cancel the request; and
receiving one or more control instructions for the first vehicle from the emergency device based on the established first communication.

* * * * *